(12) United States Patent
Zinchenko et al.

(10) Patent No.: US 10,108,381 B1
(45) Date of Patent: Oct. 23, 2018

(54) DISTRIBUTED PRINTING DEVICE MANAGEMENT METHODS AND DEVICES

(71) Applicant: KYOCERA Document Solutions Inc., Osaka (JP)

(72) Inventors: Oleksandr Zinchenko, Concord, CA (US); Oleksandr Osadchyy, Concord, CA (US)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 15/582,236

(22) Filed: Apr. 28, 2017

(51) Int. Cl.
*G06F 3/12* (2006.01)
*H04N 1/00* (2006.01)

(52) U.S. Cl.
CPC .......... *G06F 3/1276* (2013.01); *G06F 3/1236* (2013.01); *G06F 3/1268* (2013.01); *G06F 3/1288* (2013.01); *H04N 1/00244* (2013.01); *H04N 1/00477* (2013.01); *H04N 2201/0094* (2013.01)

(58) Field of Classification Search
USPC ....................................................... 358/1.15
See application file for complete search history.

(56) References Cited

U.S. PATENT DOCUMENTS

| | | | |
|---|---|---|---|
| 6,904,452 B2* | 6/2005 | Sedky | H04L 29/06 709/203 |
| 8,994,990 B2 | 3/2015 | Kimura | |
| 2006/0017969 A1* | 1/2006 | Ly | G06F 3/1204 358/1.15 |
| 2009/0031312 A1* | 1/2009 | Mausolf | G06F 9/4881 718/102 |
| 2009/0251730 A1* | 10/2009 | Yamaguchi | H04N 1/00204 358/1.15 |
| 2014/0201073 A1 | 7/2014 | Jenkins, Jr. et al. | |

* cited by examiner

*Primary Examiner* — Ngon Nguyen
(74) *Attorney, Agent, or Firm* — McDonnell Boehnen Hulbert & Berghoff LLP

(57) ABSTRACT

The present disclosure relates to distributed printing device management methods and devices. One example embodiment includes a method. The method includes receiving, at a first server within a network of distributed servers, an operation to be executed on a printing device. The method also includes transmitting, by the first server, a notification, to other servers within the network of distributed servers, indicating that the operation is available for execution. Further, the method includes receiving, at the first server, a response, from a second server within the network of distributed servers, indicating that the second server is available to execute the operation. Additionally, the method includes transmitting, by the first server, details associated with the operation to the second server. In addition, the method includes receiving, by the first server, a message from the second server indicating that the second server executed the operation on the printing device.

20 Claims, 14 Drawing Sheets

DISTRIBUTED PRINTING DEVICE MANAGEMENT METHODS AND DEVICES

BACKGROUND

Unless otherwise indicated herein, the materials described in this section are not prior art to the claims in this application and are not admitted to be prior art by inclusion in this section.

In recent years, various types of image forming devices (e.g., printing devices) have become popular for both business and consumer use. In addition to traditional black and white printers, color printers, scanners, copiers, fax machines, and other components are now common. Multifunctional products (MFPs), which support two or more of these operations, are also widely available.

Organizations (e.g., multi-national organizations or global organizations) may use a multitude of printing devices to service employees and/or clients of their organization. For example, if an organization has ten locations across the United States, each location may have an allotted number of printing devices to print, scan, fax, or otherwise process documents for members of the organization. The printing devices may be monitored (e.g., in case a malfunction occurs) and/or maintained (e.g., frequently upgraded to improve functionality).

In large organizations or large networks, monitoring and maintaining the various printing devices within the organization or network can be difficult. It can be particularly challenging to do reliably and efficiently if a single, centralized server is being used to manage a set of agents to perform maintenance on the printing devices.

SUMMARY

The specification and drawings disclose embodiments that relate to distributed printing device management methods and devices.

In a first aspect, the disclosure describes a method. The method includes receiving, at a first server within a network of distributed servers, an operation to be executed on a printing device. The printing device is communicatively coupled to at least one of the distributed servers within the network. The method also includes transmitting, by the first server, a notification, to other servers within the network of distributed servers, indicating that the operation is available for execution. Additionally, the method includes receiving, at the first server, a response, from a second server within the network of distributed servers, indicating that the second server is available to execute the operation. The response indicates that the second server has available computing resources to execute the operation. Further, the method includes transmitting, by the first server, details associated with the operation to the second server. In addition, the method includes receiving, by the first server, a message from the second server indicating that the second server executed the operation on the printing device.

In a second aspect, the disclosure describes a method. The method includes receiving, at a second server within a network of distributed servers, a notification from a first server within the network indicating that an operation is available for execution. The task is to be executed on a printing device communicatively coupled to at least one of the distributed servers within the network. The method also includes transmitting, by the second server, a response to the first server indicating that the second server is available to execute the operation. The response indicates that the second server has available computing resources to execute the operation. In addition, the method includes receiving, by the second server, details associated with the operation from the first server. Further, the method includes executing, by the second server, the operation on the printing device. The method additionally includes transmitting, by the second server, a message to the first server indicating that the second server executed the operation on the printing device.

In a third aspect, the disclosure describes a computing device with instructions stored thereon on a non-transitory, computer-readable medium that, when executed by a processor, performs actions. The actions include receiving, at the computing device, an operation to be executed on a printing device. The computing device is located within a network of distributed servers. The printing device is communicatively coupled to at least one of the distributed servers within the network. The actions further include transmitting, by the computing device, a notification, to other servers within the network of distributed servers, indicating that the operation is available for execution. Additionally, the actions include receiving, at the computing device, a response, from a second computing device within the network of distributed servers, indicating that the second computing device is available to execute the operation. The response indicates that the second computing device has available computing resources to execute the operation. The actions also include transmitting, by the computing device, details associated with the operation to the second computing device. In addition, the actions include receiving, by the first computing device, a message from the second computing device indicating that the second computing device executed the operation on the printing device.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
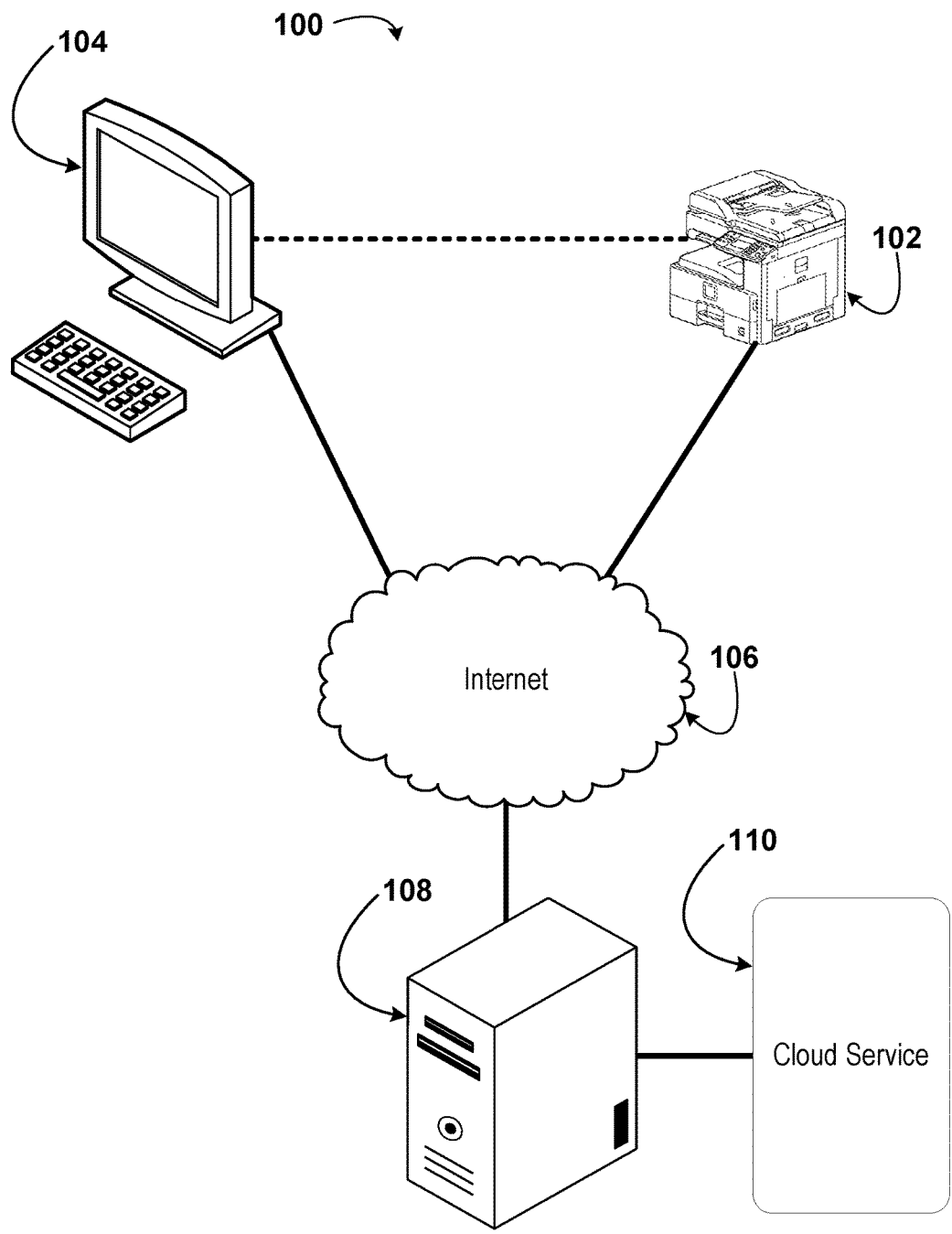
FIG. 1 is an illustration of a printing system, according to example embodiments.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the figures should not be viewed as limiting. It should be understood that other embodiments might include more or less of each element shown in a given figure. In addition, some of the illustrated elements may be combined or omitted. Similarly, an example embodiment may include elements that are not illustrated in the figures.

I. OVERVIEW

Example embodiments may relate to distributed printing device management methods and devices.

One example includes a method of executing an operation on one or more printing devices within a network of distributed servers. The network of distributed servers and printing devices may be located within an organization. For example, the organization may span across multiple cities, states, nations, or continents. In some embodiments, the network may represent a subset of the organization (e.g., the corporate headquarters or the manufacturing facility), whereas in alternate embodiments, the network may represent the entirety of the organization. The distributed servers may be interchangeably referred to as "nodes." Further, the distributed servers may be communicatively coupled to one another. In addition, one or more of the distributed servers may be communicatively coupled to one or more of the printing devices.

Rather than a single centralized server recruiting agents to execute operations on respective printing devices, as in alternate systems, each distributed server within the network may be capable of recruiting other servers to execute the operation as well as executing operations, itself. In addition, each of the distributed servers may be capable of communicating with every other distributed server and every printing device, rather than only a subset, in some embodiments. Each distributed server within the network may be substantially similar or exactly identical to every other distributed server within the network, which allows for reduced complexity. For example, in some embodiments, each of the distributed servers may be identical in terms of hardware and software. In addition, using this network architecture, additional nodes can be added or removed from the network, as necessary, without disturbing the entire network topology. Still further, such a network topology may allow for targeted capability increases of certain distributed servers (e.g., those distributed servers that are more likely to service printing devices that are relatively new and/or complex).

Each of the distributed servers may have installed thereon one or more "microservices," for example. Microservices may be lightweight, distributable, modular sets of instructions (e.g., software or firmware) that are executable to perform specific tasks. The use of a microservice architecture, as opposed to alternate architectures, such as a monolithic architecture, may provide independent deployability, upgradability, replicability, adaptability, and reliability (because the network is not relying on a single, centralized server). Further, microservice architecture may allow for a tailoring of each server's capabilities to the computing resources of the respective server, which allows for specialization. The microservices installed across the distributed servers within the network may provide for the processing and execution of operations on printing devices within the network.

For example, when an operation is to be executed on one or more printing devices, the operation may be sent to a microservice within one of the distributed servers (the "first server"). The operation may be a portion of a larger request called a "task." In some embodiments, a terminal device (e.g., a desktop or laptop computing device) may transmit a task request that includes the operation to the first server based on user input. Which of the distributed servers within the network is chosen by the terminal device to process the task may be chosen at random. Such a random selection may provide first-level load balancing of the task within the system. Tasks may include multiple operations for executing on one or more printing devices (e.g., a firmware upgrade operation and a restart operation may be contained within a single task). Further, the first server may execute instructions contained within additional microservices to process the task and distribute the operations associated with the task to other servers.

As an example, the first server may execute a task manager (e.g., a microservice called a "task manager") to alert other distributed servers of the operation that is available for execution. Additionally, in order to communicate with the other distributed servers (e.g., other microservices within other distributed servers), the first server may execute a service registry (e.g., a microservice called a "service registry") to retrieve the address locations (e.g., uniform resource locators, URLs) of the other distributed servers. In addition, each of the distributed servers may have sets of instructions (e.g., microservices) that are executable to actually execute the operations on the printing devices within a network. These sets of instructions may be referred to as "workers." Each distributed server may have multiple workers. In addition, each individual worker may contain instructions that are specialized to execute operations on specific types of printing devices (e.g., specific makes, models, or manufacturers). Additionally or alternatively, each individual worker may be executable to perform only certain types of operations (e.g., some workers may be capable of upgrading firmware, some workers may be capable of polling printing devices for current device states, and some workers may be capable of both firmware upgrades and polling).

If, upon receiving the alert from the first server that an operation is available for execution, any distributed servers have one or more available workers to execute the operation, those servers may respond to the first server with an affirmation of availability. In some embodiments, only those distributed servers with workers presently available to execute the operation may respond to the request from the first server. In such embodiments, the workers associated with the distributed servers may be referred to as "lazy" workers. Because only distributed servers with availability respond, second-level load balancing of operations may be achieved.

The first server may select from among the one or more distributed servers that responded indicating availability which server should execute the operation. If only one distributed server responded to the first server, the first server may select the sole responder. Where multiple distributed servers respond, the first server may select a distributed server based on a priority table (e.g., stored within a memory of the server). Alternatively, the first server may choose one of the available distributed servers at random (e.g., to achieve additional load balancing). Other selection mechanisms for choosing among multiple available distributed servers are also possible (e.g., based on the speed with which each server estimates it can complete the operation).

The first server may then transmit operation metadata to the selected distributed server. The operation metadata may contain the data necessary for the worker of the selected distributed server to execute the operation on the one or more printing devices (e.g., new version of firmware or specific information to be polled from the printing device, based on what the operation entails). The selected server may then execute the operation on the one or more printing devices identified in the operation metadata (e.g., the selected server may upgrade the firmware on one or more identified printing devices). Upon completion of the operation, the selected server may respond to the first server to indicate that the operation has been completed. Further, if any errors occurred during the execution of the operation on the printing device, the selected server may communicate this to the first server, as well. In some embodiments, the first server and the selected server may be one and the same (e.g., a worker of the first server executes the operation that was processed by a task manager of the first server), in which case, no communication may be necessary.

II. EXAMPLE SYSTEMS

FIG. 1 is an illustration of a printing system 100, according to example embodiments. The printing system 100 may include a printing device 102, a terminal device 104, an internet 106, a cloud server 108, and a cloud service 110.

Figure 3:
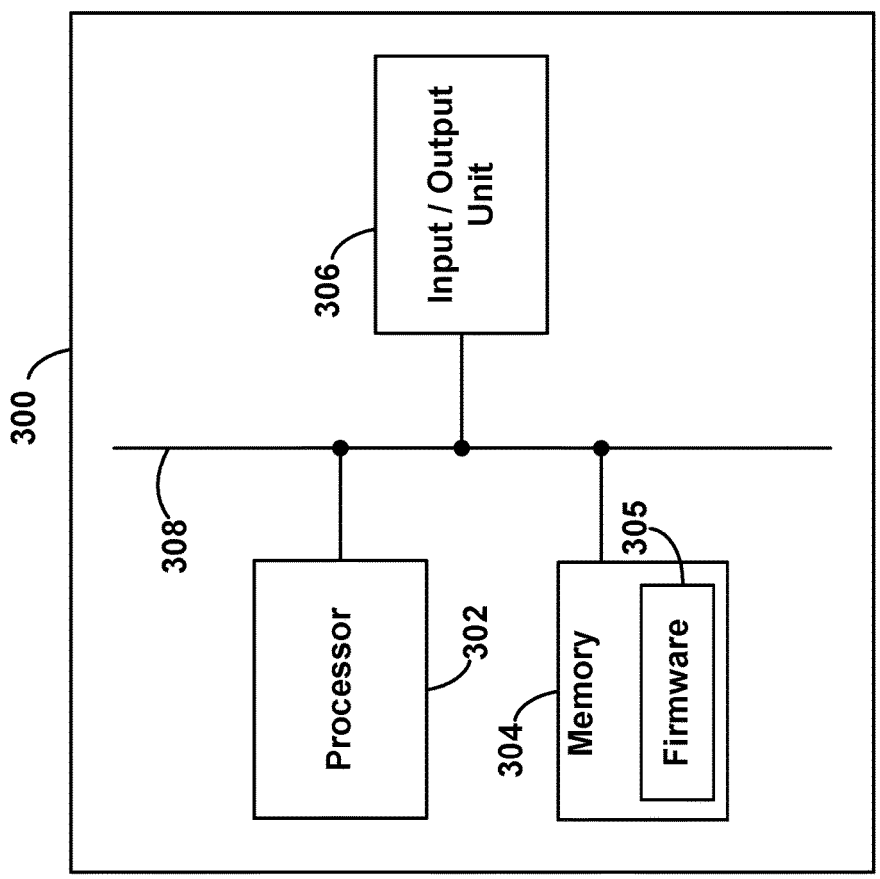
FIG. 3 is a schematic block diagram illustrating components of an image forming device, according to example embodiments.

The printing device 102 is configured to reproduce digital data (e.g., by printing the digital data). In some embodiments, this may include a two-dimensional (2D) print onto paper using ink. Additionally or alternatively, reproducing digital data may include three-dimensional (3D) printing. In addition to printing, the printing device 102 may be configured to perform other functions, such as scanning or faxing, as is the case when the printing device 102 is a multi-functional peripheral (MFP). Further, the printing device may include one or more computing components, in some embodiments (e.g., as illustrated in FIG. 3).

The terminal device 104 is a device that may be configured to take input commands from a user and communicate those commands to the printing device 102 or the cloud server 108. The terminal device 104 may communicate with the printing device 102 and the cloud server 108 through the internet 106 (e.g., the public Internet), as illustrated. Additionally, the terminal device 104 may, in some embodiments, communicate with the printing device 102 locally, such as over a LAN or wide area network (WAN). This communication may take place wirelessly (e.g., using BLUETOOTH® or Wi-Fi®, IEEE 802.11 standards) or via wireline connection (e.g., a universal serial bus, USB, connection or an Ethernet connection), in various embodiments. For example, the terminal device 104 may communicate with the printing device 102 to send print jobs to the printing device 102 or to receive digitized versions of scanned photos. The terminal device 104 may also communicate operations to the cloud server 108 over the internet 106 (e.g., operations to be executed on the printing device 102).

The terminal device 104 may be selected from among a variety of different devices. The terminal device 104 may be a personal computer (PC), as illustrated, in some embodiments. Alternatively, the terminal device 104 may be a tablet computing device or a mobile computing device (e.g., mobile phone). In still other embodiments, the terminal device 104 may be a combination of multiple devices (e.g., a tablet computing device that is wirelessly tethered to a personal computer). Further, in some embodiments, the printing system 100 may include more than one terminal device. For example, the printing system 100 may include a first terminal device in the form of a PC and a second terminal device in the form of a tablet computing device.

Figure 4:
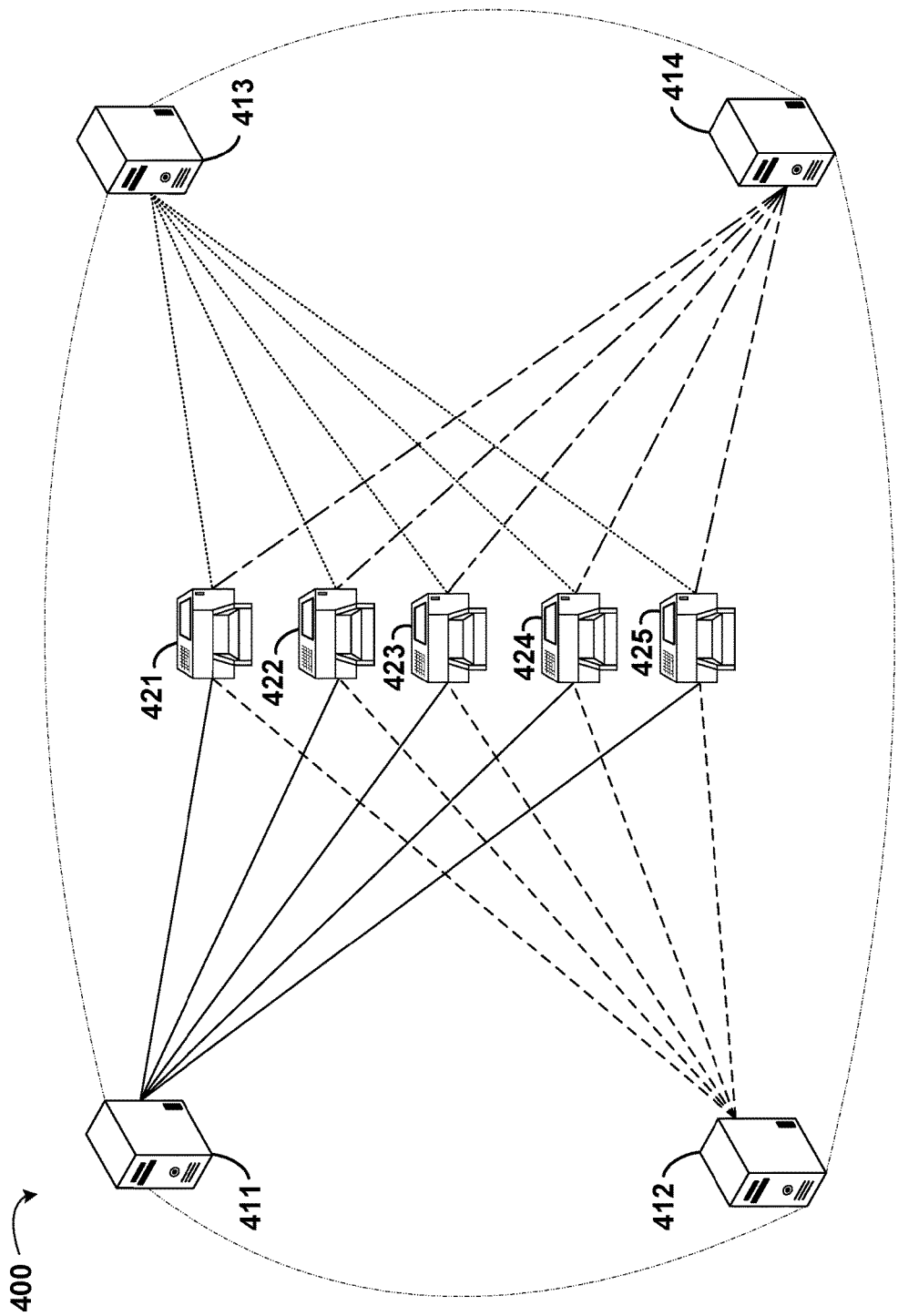
FIG. 4 is a diagram illustrating a network, according to example embodiments.

The cloud server 108 may be a server that facilitates interaction between the terminal device 104 and/or the printing device 102 and the cloud service 110. The cloud server 108 may be configured to perform actions on the printing device 102, as well (e.g., the cloud server 108 may be one of many servers, as illustrated in FIG. 4, which collectively manage printing devices within a network or organization). Further, the cloud server 108 may contain a memory. The memory may be a non-transitory, computer-readable medium that includes a volatile memory, such as a random access memory (RAM), and/or a non-volatile memory, such as a read-only memory (ROM). The memory may store instructions, executable by a processer of the cloud server 108, to communicate with the terminal device 104 and/or the printing device 102 over the internet 106. Additionally or alternatively, such a memory may store instructions, executable by a processor of the cloud server 108, to perform the operations of the cloud service 110. In other words, in some embodiments, the cloud service 110 may represent software internal to the cloud server, rather than a component external to the cloud server 108. Even further, such a memory may store data for use by the cloud service 110. In some embodiments, servers will be used that are not located on clouds, but rather on internal networks (i.e., the cloud server 108 may be replaced by one or more non-cloud servers).

The cloud service 110 may be a subscription service associated with the cloud server 108. Alternatively, the cloud service 110 may be spread across multiple cloud servers or devices. For example, the cloud service 110 may be executed by processing units spread across multiple cloud servers according to multiple sets of instructions stored within memories of the corresponding multiple cloud servers.

The terminal device 104 and/or the printing device 102 may have credentials (e.g., a user identification, ID, as well as an associated password) used to authenticate the respective device before logging into the cloud service 110. Within the cloud service 110, there may be an association between the terminal device 104 and the printing device 102 and/or between the cloud server 108 and the printing device 102. For example, the cloud service 110 may permit the terminal device 104 to access information about the printing device 102 using the cloud service 110, and vice versa. Further, the cloud service 110 may permit requests originating from the terminal device 104 (e.g., printing requests or firmware upgrade requests) to be transmitted to and/or executed on the printing device 102.

The cloud server 108 and the cloud service 110 may be located on a public or private cloud. For example, in some embodiments, the cloud service 110 may be implemented using MICROSOFT® AZURE® or CITRIX® XEN-SERVER®.

Figure 2:
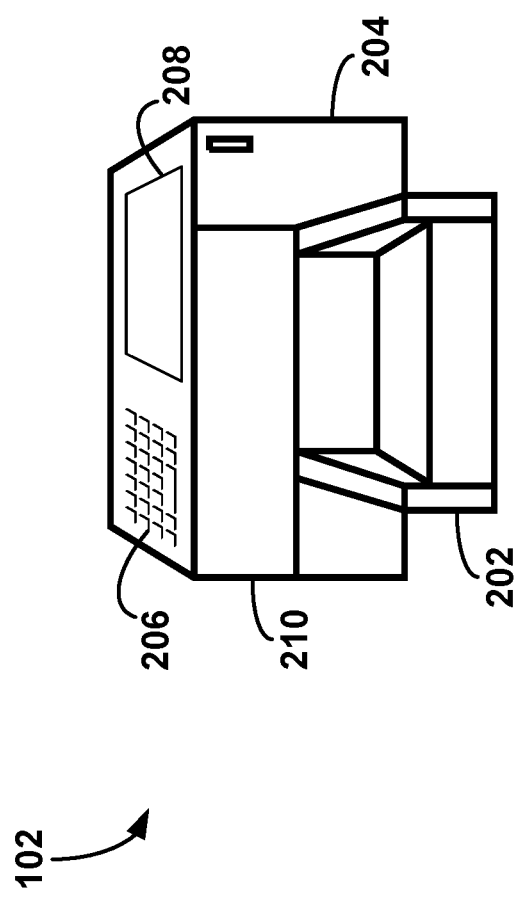
FIG. 2 is an illustration of a printing device, according to example embodiments.

FIG. 2 depicts an example printing device 102. The printing device 102 may be configured to print electronic documents on various types of physical output media. These output media include, but are not limited to, various sizes and types of paper, overhead transparencies, and so on. The printing device 102 may be interchangeably referred to as a "printer", a "printing device", a "printing apparatus", an "image forming device", an "image processing apparatus", an "image processing device", "an image forming apparatus", etc.

The printing device 102 may serve as a local peripheral to a terminal device 104, such as a personal computer. In these cases, the printing device 102 may be attached to the terminal device 104 by cable, such as a serial port cable, parallel port cable, USB cable, FIREWIRE® (IEEE 1394) cable, or High-Definition Multimedia Interface (HDMI) cable. Thus, the terminal device 104 may serve as a source of electronic documents (e.g., in the form of document data) for the printing device 102.

Additionally or alternatively, the printing device 102 may include a wireline or wireless network interface, such as an Ethernet or Wi-Fi® (IEEE 802.11 standards) interface. So arranged, the printing device 102 may serve as a printing device for any number of terminal devices that can communicate with the printing device 102 over a network. In some embodiments, the printing device 102 may serve as both a local peripheral and a networked printer at the same time. In order to use the printing device 102, terminal devices may install one or more drivers. These drivers may include software that converts electronic documents to be printed from various local representations, stored on the terminal devices, to one or more representations supported by the printing device 102.

Regardless, the printing device 102 may comprise a computing device, and may carry out both printing-related and non-printing related functions. For instance, the printing device 102 may also include copier, fax, and scanner functions (e.g., the printing device 102 may be a multi-functional product, MFP). In some embodiments, the printing device 102 may use a scanning unit to facilitate copier and/or fax functions. For instance, the printing device 102 may scan a physical document into an electronic format, and then print the resulting electronic document to provide a copy, and/or transmit the resulting electronic document via a telephone interface to provide a fax operation. Additionally, the printing device 102 may be able to receive a faxed electronic document via a telephone interface, and then compress and store a representation of this electronic document and/or print the electronic document.

In order to support its various capabilities, the printing device 102 may include a document feeder/output tray 202, a paper storage 204, a user interface 206, a scanning element 208, and a chassis 210. It is understood that printing devices may take on a wide variety of forms. As such, the printing device 102 may include more or fewer components than depicted in FIG. 2, and/or components arranged in a different fashion than depicted in FIG. 2.

The document feeder/output tray 202 may hold physical documents (e.g., a stack of one or more sheets of paper) that are to be scanned, copied, or faxed. The document feeder/output tray 202 may allow the printing device 102 to automatically feed multiple physical documents for processing by the printing device 102 without requiring manual intervention. The document feeder/output tray 202 may also include one or more separate output trays for holding physical documents that have been processed by the printing device 102. These may include physical documents that have been printed, scanned, copied, or faxed by the printing device 102, as well as physical documents that have been produced, e.g., by the fax and/or copying functions of the printing device 102.

Paper storage 204 may include trays and/or feeding elements for various types of physical media. For instance, paper storage 204 may include separate trays for 8.5×11 inch paper, A4 paper, letterhead paper, envelopes, and so on. For any operation of the printing device 102 that involves outputting physical media (e.g., printing, copying, and/or receiving a fax), paper storage 204 may supply the physical media.

The user interface 206 may facilitate the interaction of the printing device 102 with a human or non-human user, such as to receive input from a user and to provide output to the user. Thus, the user interface 206 may include input components such as a keypad, keyboard, touch-sensitive or presence-sensitive panel, joystick, microphone, still camera, and/or video camera. The user interface 206 may also include one or more output components such as a display screen (which, for example, may be combined with a presence-sensitive panel), a cathode ray tube (CRT), a liquid crystal display (LCD), a light emitting diode (LED) based display, a display using digital light processing (DLP®) technology, a light bulb, and/or one or more other similar devices, now known or later developed. The user interface 206 may also be configured to be able to generate audible output(s) via a speaker, speaker jack, audio output port, audio output device, earphones, and/or other similar devices, now known or later developed.

The scanning element 208 may be a glass panel below which a movable light source operates to scan physical media placed on top of the glass panel. Alternatively, a digital camera below the glass panel may "scan" the physical media placed on top of the glass panel by taking a picture of the physical media. Images of scanned physical media may be stored in data storage associated with the printing device 102.

The chassis 210 may include a physical housing that contains and/or interconnects various components of the printing device 102, such as the document feeder/output tray 202, paper storage 204, the user interface 206, and the scanning element 208. Additionally, the chassis 210 may house other components not shown in FIG. 2. For example, the chassis 210 may contain one or more toner cartridges, liquid ink jets, belts, rollers, and/or power supplies. Further, the chassis 210 may include communication interfaces, such as wireline and/or wireless network interfaces, a telephony interface (e.g., an RJ45 jack), a USB interface, a BLUETOOTH® interface, a card reader port, etc.

Moreover, as the printing device 102 may employ general-purpose and/or specially-designed computing device components, the chassis 210 may also house some or all of these components. To that point, FIG. 3 depicts an example embodiment of computing device components 300 (e.g., functional elements of a computing device) that may be included in the printing device 102.

Computing device components 300 may include a processor 302, a memory 304, and an input/output unit 306, all of which may be coupled by a system bus 308 or a similar mechanism. The processor 302 may include one or more central processing units (CPUs), such as one or more general purpose processors and/or one or more dedicated processors (e.g., application specific integrated circuits (ASICs) or digital signal processors (DSPs)).

The memory 304, in turn, may comprise volatile and/or non-volatile data storage and can be integrated in whole or in part with the processor 302. The memory 304 may store program instructions, executable by the processor 302, and data that are manipulated by these instructions to carry out the various methods, processes, or functions described herein. Alternatively, these methods, processes, or operations can be defined by hardware, firmware, and/or any combination of hardware, firmware, and software. Therefore, memory 304 may include a tangible, non-transitory, computer-readable medium, having stored thereon program instructions that, upon execution by one or more processors 302, cause the respective devices to carry out any of the methods, processes, or functions disclosed in this specification or the accompanying drawings.

One set of instructions within the memory 304 may be firmware 305. The firmware 305 may contain instructions, executable by the processor 302, which enable the printing device 102 to process documents. For example, some of the instructions contained within the firmware 305 may assist the printing device 102 in printing documents sent to it by the terminal device 104.

The memory 304 may also be configured to store compressed and non-compressed electronic documents that may later be processed (e.g., printed or faxed), such as a document that represents a print job that is received by the printing apparatus 102 and designates a future time for completion. Thus, the memory 304 may serve as an output medium for these electronic documents.

The input/output unit 306 may include any of the operations and/or elements described in reference to the user interface 206. Thus, the input/output unit 306 may serve to configure and/or control the operation of the processor 302. The input/output unit 306 may also provide output based on the operations performed by the processor 302.

Similar components to those illustrated in FIG. 3 may be included within the terminal device 104 or the cloud server 108, in various embodiments. In such embodiments, the memory 304 within the terminal device 104 and/or the cloud server 108 may not include the firmware 305.

FIG. 4 illustrates a network 400, according to example embodiments. The network 400 includes a multiple servers 411, 412, 413, 414 and multiple printing devices 421, 422, 423, 424, 425. In some embodiments, the network 400 may span a geographical location. For example, the network 400 may span a section of a floor of a building, an entire floor of a building, an entire building, a city, a state, a country, a continent, etc. Additionally, the printing devices 421, 422, 423, 424, 425 and/or the servers 411, 412, 413, 414 may be located at various locations within the network 400. For example, the printing devices 421, 422, 423, 424, 425 may be located in different countries worldwide. In some embodiments, the servers 411, 412, 413, 414 may be located remotely from the printing devices 421, 422, 423, 424, 425. Further the servers 411, 412, 413, 414 may be located remotely from one another (e.g., located regionally with respected to the printing devices 421, 422, 423, 424, 425) or located centrally with respected to the printing devices 421, 422, 423, 424, 425 (e.g., in a server farm).

Additionally, the printing devices 421, 422, 423, 424, 425 may represent the printing devices within a given organization. Similarly, the servers 411, 412, 413, 414 may service the organization associated with the printing devices 421, 422, 423, 424, 425. In some embodiments, one, multiple, or all of the servers 411, 412, 413, 414 may additionally service other organizations.

As illustrated in FIG. 4, each of the servers 411, 412, 413, 414 is communicatively coupled to each of the printing devices 421, 422, 423, 424, 425. In this way, each of the servers 411, 412, 413, 414 is capable of executing operations on each of the printing devices 421, 422, 423, 424, 425. Operations may include updating firmware on each of the devices, for example. Further, as illustrated, each of the servers 411, 412, 413, 414 may be communicatively coupled to one another (e.g., to request/distribute operations). The servers 411, 412, 413, 414 may communicate with one another within a LAN (e.g., over Wi-Fi®) or over the public Internet (e.g., using TCP/IP), in various embodiments.

Figure 5:
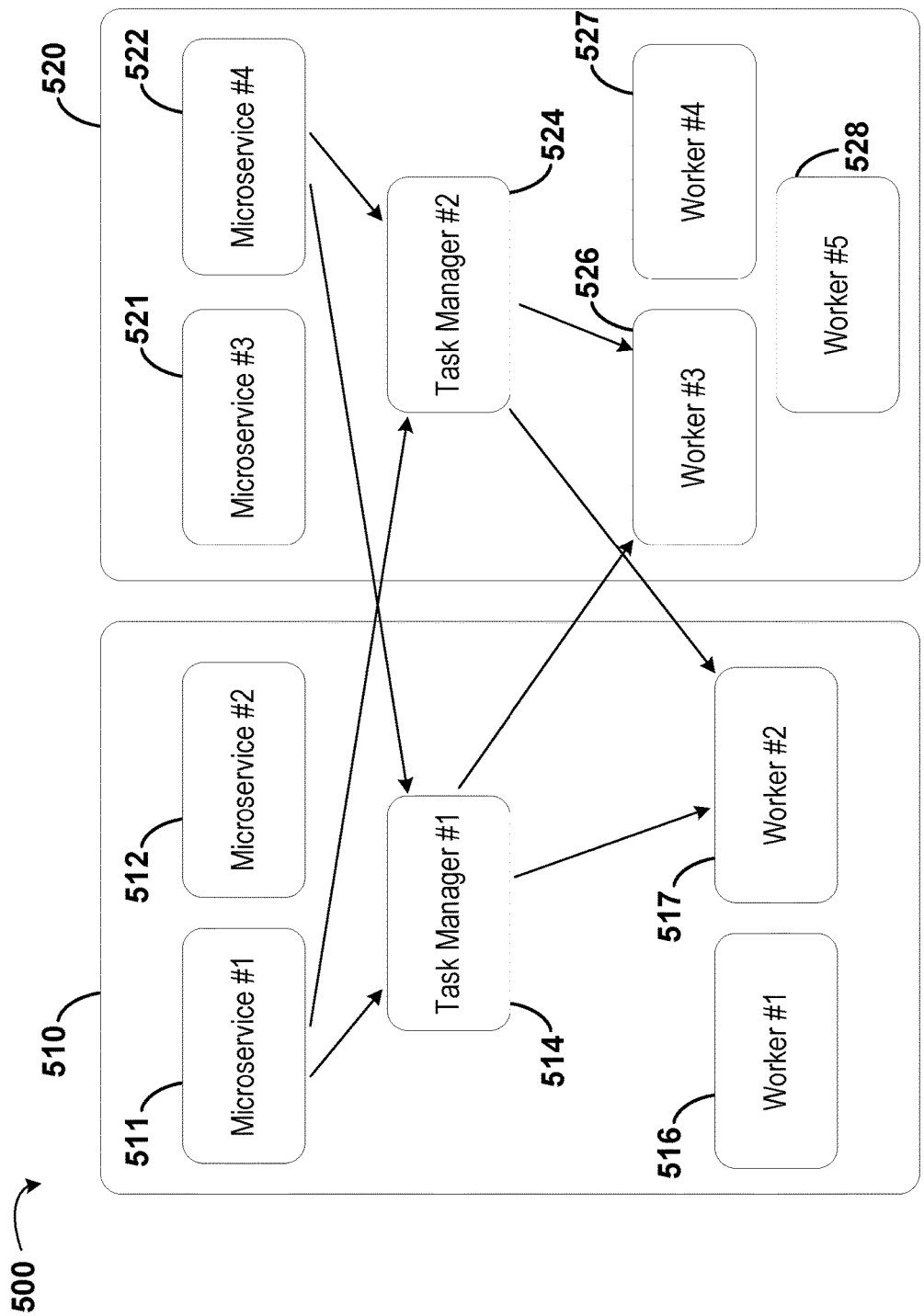
FIG. 5 is a schematic block diagram illustrating two servers, according to example embodiments.

FIG. 5 illustrates a system 500 that includes a first server 510 and a second server 520. The first server 510 and the second server 520 each include instructions stored thereon that, when executed (e.g., by a processor of the server), perform methods as described herein (e.g., generating, distributing, and executing operations). The two servers may be communicatively coupled (e.g., over the public Internet), for example (e.g., similar to two of the servers 411, 412, 413, 414 illustrated in FIG. 4). The first server 510 has instructions corresponding to a first microservice 511, a second microservice 512, a first task manager 514, a first worker 516, and a second worker 517. The second server 520 has instructions corresponding to a third microservice 521, a fourth microservice 522, a second task manager 524, a third worker 526, a fourth worker 527, and a fifth worker 528. The quantity and type of instructions within each of the servers 510, 520 may be dynamically adjusted based on data collected from deployment of the servers 510, 520. For example, if one or more of the microservices 511, 512, 521, 522 is underutilized, it could be removed. In addition, if multiple requests are made to one of the servers 510, 520 that cannot be processed by a microservice of the server or executed by a worker of any server, additional microservices and/or workers may be added to one or both of the servers 510, 520.

The microservices 511, 512, 521, 522 represent a portion of executable instructions (e.g., in any combination of hardware, software, or firmware). The microservices 511, 512, 521, 522 may be distributable, modular forms of software, for example. Such distributable, modular forms of software may be readily upgraded and substantially self-contained, such that modifications to the microservices 511, 512, 521, 522 will not adversely affect the performance of the other instructions within the servers 510, 520. In various embodiments, the task managers 514, 524 and/or the workers 516, 517, 526, 527, 528 may also be distributable, modular forms of software, similar to the microservices 511, 512, 521, 522 (i.e., the task managers 514, 524 and the workers 516, 517, 526, 527, 528 may, themselves, be referred to as microservices). Further, in alternate embodiments, the servers 510, 520 may include additional microservices not illustrated in FIG. 5.

Also, as illustrated, the second server 520 has more workers than the first server 510. The second server 520 may have more computing resources (e.g., an increased amount of non-volatile memory, an increased processor speed, or an increased amount of volatile memory) than the first server 510, allowing the second server 520 to store or execute additional instructions. The number of microservices or other instructions within a server may be scalable with the amount of computing resources. For example, if additional volatile memory or a faster processor were installed on the first server 510, additional microservices or other instructions may be installed on the first server 510, and vice versa if the computer resources of the first server 510 was reduced.

The microservices 511, 512, 521, 522 may perform specialized actions within each of the servers 510, 520. For example, the first microservice 511 may be executable to request a firmware upgrade on one or more printing devices (e.g., printing devices within a network or organization of the server, similar to illustrated in FIG. 4). However, the microservices 511, 512, 521, 522 need not be specialized. For example, the microservices 511, 512, 521, 522 may perform a variety of actions involving the printing devices, such as sending print jobs to the printing devices.

Also as illustrated, the microservices 511, 512, 521, 522 can use the task managers 514, 524 to access workers 516, 517, 526, 527, 528 in order to execute operations. As illustrated in FIG. 5, microservices (e.g., the first microservice 511 and the second microservice 512), task managers (e.g., the first task manager 514), and workers (e.g., the first worker 516 and the second worker 517) of one server (e.g., the first server 510) can communicate with microservices, task managers, and workers of other servers (e.g., the second server 520). As an example, the first microservice 511 may be executed to request a firmware upgrade on a printing device. Then, as illustrated, the first microservice 511 may access the first task manager 514 and the second task manager 524 to find workers capable of executing the action of a firmware upgrade (e.g., configured to execute a firmware upgrade on the specific model of printing device that is targeted by the first microservice 511 for a firmware upgrade). The first task manager 514 may then contact the workers (e.g., the second worker 517 and the third worker 526) to indicate that an operation is available for execution. Based on the response from the workers, the first task manager 514 may then provide operation details to one of the workers (e.g., chosen randomly if more than one worker is available to execute the operation). The chosen worker may then execute the operation on the respective printing device and report back to the first task manager 514. This and other similar processes are additionally described with respect to FIGS. 9-11.

III. EXAMPLE PROCESSES

Figure 6A:
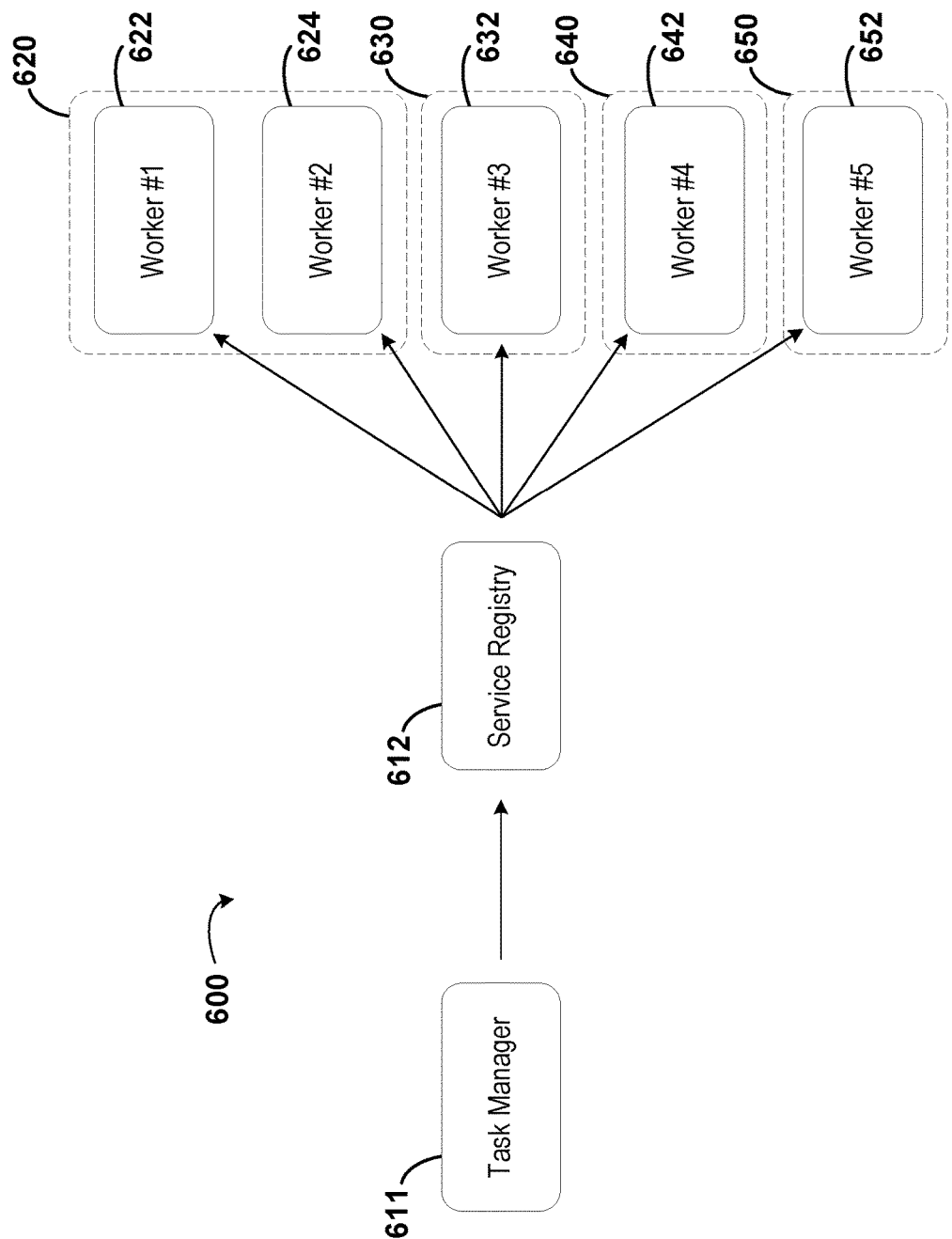
FIG. 6A is a schematic block diagram illustrating an operation distribution, according to example embodiments.

FIG. 6A illustrates an operation distribution method 600 using multiple sets of instructions (e.g., using multiple microservices stored within and executed by multiple servers). The operation distribution method 600 may be performed by a task manager 611, a service registry 612, and five workers. The five workers may include a first worker 622 and a second worker 624 residing in a first server 620, a third worker 632 residing in a second server 630, a fourth worker 642 residing in a third server 640, and a fifth worker 652 residing in a fourth server 650. The task manager 611 and the service registry 612 may also represent executable sets of instructions. For example, the task manager 611 and the service registry 612 may reside within a storage device of a single server. The task manager 611 and the service registry 612 may be in a server other than the first server 620, the second server 630, the third server 640, or the fourth server 650. In some embodiments, however, the task manager 611 and/or the service registry 612 may reside in one of the four servers illustrated (e.g., the first server 620, the second server 630, the third server 640, or the fourth server 650).

The task manager 611 is executable to create and schedule tasks. For example, when a firmware upgrade is initiated by a user request at a terminal device or a server, the task manager 611 may receive the request and create a task for the associated upgrade. The task may include multiple operations, in some embodiments (e.g., multiple operations to be executed on one or more printing devices). The task manager 611 may also receive tasks from upper level microservices (e.g., within the same server as the task manager 611). This may occur using an application programming interface, API, such as a representational state transfer (REST) API, which is exposed to the upper level microservices, for example. The task manager 611 may receive such tasks accompanied by associated operation metadata. The associated operation metadata may include general task information (e.g., the name of the task and description of the task), task execution settings (e.g., schedule for executing the task, triggers associated with the task, or retry settings for the task), task targets (e.g., on which printing devices the operations of the task are to be executed), and operations (e.g., a list of processes to be executed). As illustrated in FIG. 6A, the task manager 611 may then distribute one or more of the operations making up the task to one or more workers to execute the task (e.g., using the service registry 612). There may be a task manager 611 within each server in a network or an organization, for example. Further, if the task manager 611 receives a complex and/or compound request (i.e., "task") from a terminal device or another server (e.g., receives a task that includes multiple operations), the task manager 611 may break the task down into single, constituent operations that can be executed by workers. These single, constituent operations may then be distributed to workers rather than the complex/compound task. For example, a "set device settings" task may contain two operations (e.g., a "modify device settings" operation and a "restart device" operation). This task may thus be broken down into the two constituent operations, which are then distributed to workers. For such a task, the two operations may be distributed sequentially (e.g., the "modify device settings" operation is distributed first and then, upon completion of the "modify device settings" operation, the "restart device" operation is distributed). In other embodiments (e.g., embodiments processing other compound tasks), the constituent operations may be distributed simultaneously. For example, if a task involves a firmware upgrade on multiple printing devices (e.g., one-hundred printing devices), the constituent operations may each include upgrading firmware on one of the one-hundred printing devices. Each of these constituent operations may then be distributed simultaneously (e.g., to various workers) to be executed (e.g., to be executed simultaneously).

The service registry 612 may be a repository that maintains a global list of various sets of instructions (e.g., microservices) found within the servers in a network. Further, there may be a service registry 612 within each server in a network or an organization. Additionally, each of the service registries 612 within various servers may be identical to one another (e.g., they may be concurrently updated when a server is added to or removed from an organization or network). In other words, the service registries 612 within various servers may be duplicated and redundant across the servers within a network or organization. The service registry 612 may provide address links (e.g., in the form of URLs) to other instructions within other servers when requested (e.g., by the task manager 611). As illustrated in FIG. 6A, when the task manager has a task to be performed, the task manager 611 may access the service registry 612 to retrieve the addresses of various servers containing workers that could execute the operation(s) associated with the task (e.g., the first server 620, the second server 630, the third server 640, and the fourth server 650). Using these addresses, the task manager 611 may then contact the servers to see which server has available resources to execute the operation(s) associated with the task (e.g., to determine which of the workers 622, 624, 632, 642, 652 is currently available).

Figure 6B:
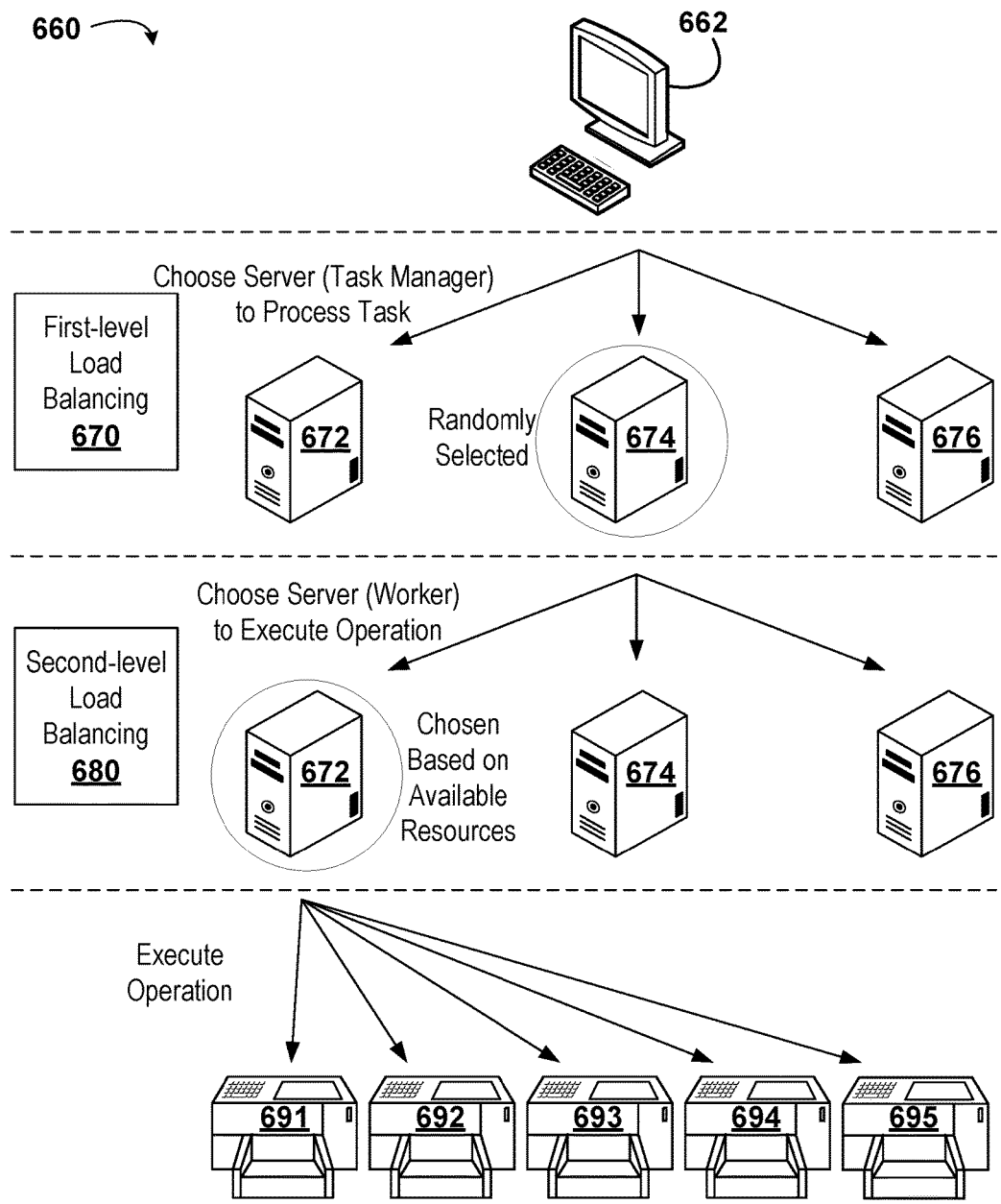
FIG. 6B is a diagram illustrating a two-level load balancing method, according to example embodiments.

FIG. 6B illustrates a two-level load balancing method 660, according to example embodiments. The two-level load balancing method 660 may be performed on a system including a terminal device 662, a first server 672, a second server 674, a third server 676, and multiple printing devices 691, 692, 693, 694, 695. The servers 672, 674, 676 may be communicatively coupled to one another and to the printing devices 691, 692, 693, 694, 695 over a network, for example. Further, the servers 672, 674, 676 and/or the printing devices 691, 692, 693, 694, 695 may service an organization. The two-level load balancing method 660 may include first-level load balancing 670 and second-level load balancing 680. Further, the two-level load balancing method 660 illustrated in FIG. 6B may inherently exhibit two-level load balancing using the devices and instructions described elsewhere in the disclosure. For example, the system 500 illustrated in FIG. 5 may naturally exhibit second-level load balancing without an implementation of any additional instructions that force load balancing.

The two-level load balancing method 660 may be initiated, as illustrated, by the terminal device 662. In some embodiments, the terminal device 662 may initiate the method based on a user input. In alternate embodiments, the two-level load balancing method may instead be initiated by one of the servers 672, 674, 676. Initiating the two-level load balancing method 660 may include the terminal device 662 choosing one of the servers 672, 674, 676 to process a task. The server which is chosen (e.g., the second server 674, as illustrated in FIG. 6B) may be selected at random by the terminal device 662. The random selection may include the terminal device 662 executing a reliable linear random generator (e.g., random generator based on a linear distribution) to select one of the servers 672, 674, 676. Such a random selection may serve to provide first-level load balancing 670. For example, each of the servers 672, 674, 676 may have an equal probability of being selected, at random, by the terminal device 662. Thus, over many two-level load balancing methods, each server should be selected an equal number of times, which leads to first-level load balancing 670 among the servers 672, 674, 676. The terminal device 662 choosing one of the servers 672, 674, 676 to process the task may include the terminal device 662 contacting a task manager (e.g., the first task manager 514 illustrated in FIG. 5) of the chosen server (e.g., the second server 674 in FIG. 6B).

The second-level load balancing 680 may be based on "lazy" workers within each of the servers 672, 674, 676. In some embodiments, the server chosen (e.g., the second server 674) in the first-level load balancing 670 may next broadcast to the servers 672, 674, 676 in the network to indicate that the chosen server has a task that requires execution. Once each of the servers 672, 674, 676 receives the broadcast, each of the servers 672, 674, 676 may execute specific instructions within the respective server to determine if the server has available "workers" (i.e., microservices capable of executing one or more operations) to execute the operations of a given task. The number of workers associated with a given server may correspond to its computing resources. If the respective server has available workers, it may respond to the randomly chosen server indicating that it can execute one or more of the operations of the task. Then, the randomly chosen server (e.g., the second server 674 in FIG. 6B) may transmit one or more of the operations of the task and associated operation metadata to the server with workers available to execute one or more of the operations of the task (i.e., available computing resources). This selection process based on available computing resources may provide the second-level load balancing 680. Further, if multiple servers respond to the broadcast indicating availability to execute one or more of the operations of a task, the randomly selected server (e.g., the second server 674) may randomly chose one of the servers that responded to execute one or more of the operations of the task. Alternatively, if multiple servers respond to the broadcast indicating availability to execute one or more of the operations of a task, the randomly selected server (e.g., the second server 674) may choose one of the servers that responded based on a priority table (e.g., stored within the server). The priority list may be "hard-coded" in the respective server, set by user input (e.g., received at a terminal device), or dynamically adjusted (e.g., in runtime) based on data gathered from associated users, associated printing devices, or associated servers. Here, "hard-coded" means a predefined or predetermined list set by a programmer of the server.

In some embodiments, only certain workers within servers can execute certain operations. For example, one worker may contain instructions to execute a firmware upgrade on a printing device, while another worker (e.g., on the same or a different server) may contain instructions to access and/or modify the settings within a printing device. Additionally or alternatively, workers may only be capable of executing operations on specific models of printing device. For example, one worker may contain instructions executable to update firmware on a printing device with a first model number, whereas a second worker may contain instructions executable to update firmware on a printing device with a second model number.

Next in the two-level load balancing method 660, the server chosen to execute the one or more operations based on available resources (e.g., the first server 672) executes a section of code within the server (e.g., executes a "worker") to execute the operation(s) on one or more of the printing devices 691, 692, 693, 694, 695. Upon completion of the operation(s) on the one or more printing devices 691, 692, 693, 694, 695, the server chosen to execute the operation(s) (e.g., the first server 672 illustrated in FIG. 6B) may respond to the server randomly chosen to process the task (e.g., the second server 674 illustrated in FIG. 6B) to report the completion of the operation(s).

Figure 7:
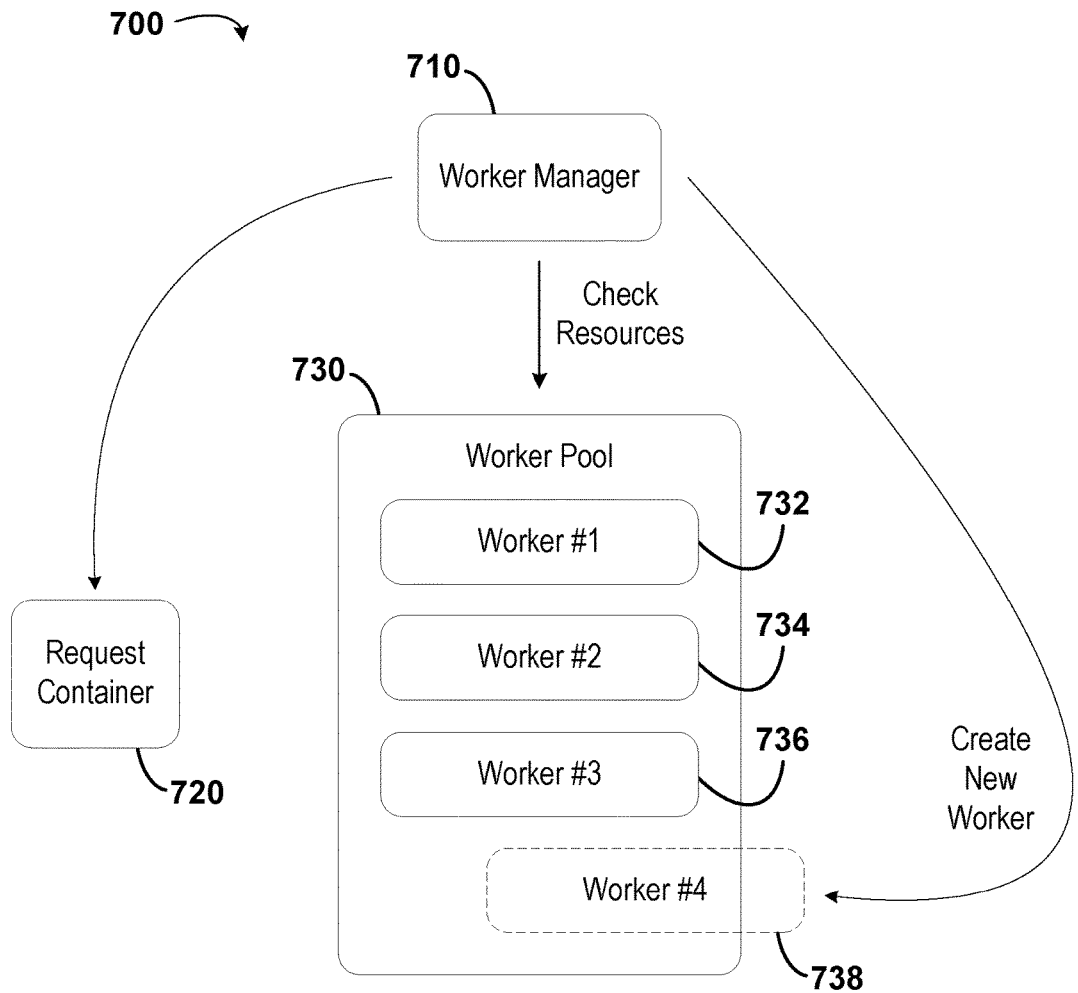
FIG. 7 is a schematic block diagram illustrating a worker creation, according to example embodiments.

FIG. 7 is a schematic block diagram illustrating a method 700 of adding a worker (a fourth worker 738) to a worker pool 730. Prior to the addition of the fourth worker 738, the worker pool 730 includes a first worker 732, a second worker 734, and a third worker 736. The addition of the fourth worker 738 to the worker pool 730 may be performed by a worker manager 710 based on requests within a request container 720. The workers 732, 734, 736, 738 may be sets of instructions that can execute operations on one or more printing devices. Each worker may be capable of executing one type of operation. Alternatively, each worker may be capable of executing two or more types of operations. Further, workers may be specialized in that they can only execute operations on certain models of printing devices. Alternatively, workers may be model-agnostic (i.e., capable of executing operations on multiple or all models of printing devices).

The worker manager 710 may be a set of instructions within a server that is executable to create or remove workers from the worker pool 730. The worker manager 710 may, for example, periodically check the request container 720 to identify if there are pending requests to be executed by the server. Further, the worker manager 710 may create new workers if computing resources are available within the server. In addition, in some embodiments, the worker manager 710 may not create new workers if a maximum number of workers has been reached. The maximum number of workers may be defined based on the total amount of computing resources (rather than the available amount) within the server. Alternatively, the maximum number of workers may be set according to a user input. Additionally, the worker manager 710 may periodically check the state of each of the workers within the worker pool 730 to avoid dead instances. For example, if a worker is not being used to execute operations and has not been used for a threshold amount of time, the worker manager 710 may remove the worker from the worker pool 730.

The request container 720 is a set of instructions executable to store and manage all the pending requests from task managers in various servers. The pending requests may be stored within a memory (e.g., a hard drive or a solid state drive) of the server, for example. Further, each request in the request container 720 may be associated with a given operation to be executed on a printing device. Each of the operations associated with the requests in the request container 720 may have a priority level associated with it. Workers may execute the requests that are associated with operations having higher priority levels before those that are associated with lower priority levels. If multiple requests are associated with operations having the same priority level, the request container 720 may select a request at random from among those having the same priority level to provide to a worker for execution. Example operations associated with requests in the request container include a "get properties" operation, an "upgrade firmware" operation, or a "poll device for sensor data" operation. Further, the "get properties" operation may have a "high" priority level, the "upgrade firmware" operation may have a "mid" priority level, and the "poll device for sensor data" operation may have a "low" priority level. The "get properties" operation may include retrieving various settings of a printing device (e.g., to display to a user). In addition, the "upgrade firmware" operation may include installing upgraded firmware on a printing device (e.g., to enable additional capabilities to the printing device). Further, the "poll device for sensor data" operation may include the server requesting device data from the printing device (e.g., to use in evaluating the use or efficiency of the printing device).

As described above, the request container 720 may contain multiple requests (e.g., operations) for execution by workers within a corresponding distributed server. This may be a consequence of the corresponding distributed server accepting tasks from more than one other distributed server. Hence, rather than having one operation stored within the request container 720 for execution by the workers 732, 734, 736, 738 in the worker pool 730, as in some embodiments, there are multiple operations stored within the request container 720. In some embodiments, however, once there is one operation in the request container 720, the distributed server will not accept additional operations until the operation in the request container 720 has been executed or has begun being executed by one of the workers 732, 734, 736, 738.

The worker pool 730 may include a portion of a storage device within a respective distributed server used to store various workers (e.g., the first worker 732, the second worker 734, and the third worker 736). The number of workers initially placed in the worker pool 730 during deployment of an associated distributed server may be based on an estimate of how many workers can be supported given the computing resources of the associated distributed server. In some embodiments, the worker pool 730 may be dynamically resizable in response to additional workers being created/added to the worker pool 730 (e.g., similar to the fourth worker 738 illustrated in FIG. 7). The worker pool 730 may also be dynamically resizable in response to a worker being removed from the worker pool 730 (i.e., decommissioned). The worker pool 730 may also include sections of volatile memory (e.g., RAM) used to execute the workers. As illustrated in FIG. 7, the worker manager 710 may access the worker pool 730 to determine whether workers should be added to and/or removed from the worker pool 730 (e.g., based on available computing resources). For example, if there are additional computing resources available, workers may be added to the worker pool 730. Similarly, if computing resources are overloaded, workers may be removed from the worker pool 730. In addition, the number of workers within the worker pool 730 may be based on tracked usage of the respective distributed server over time.

Figure 8:
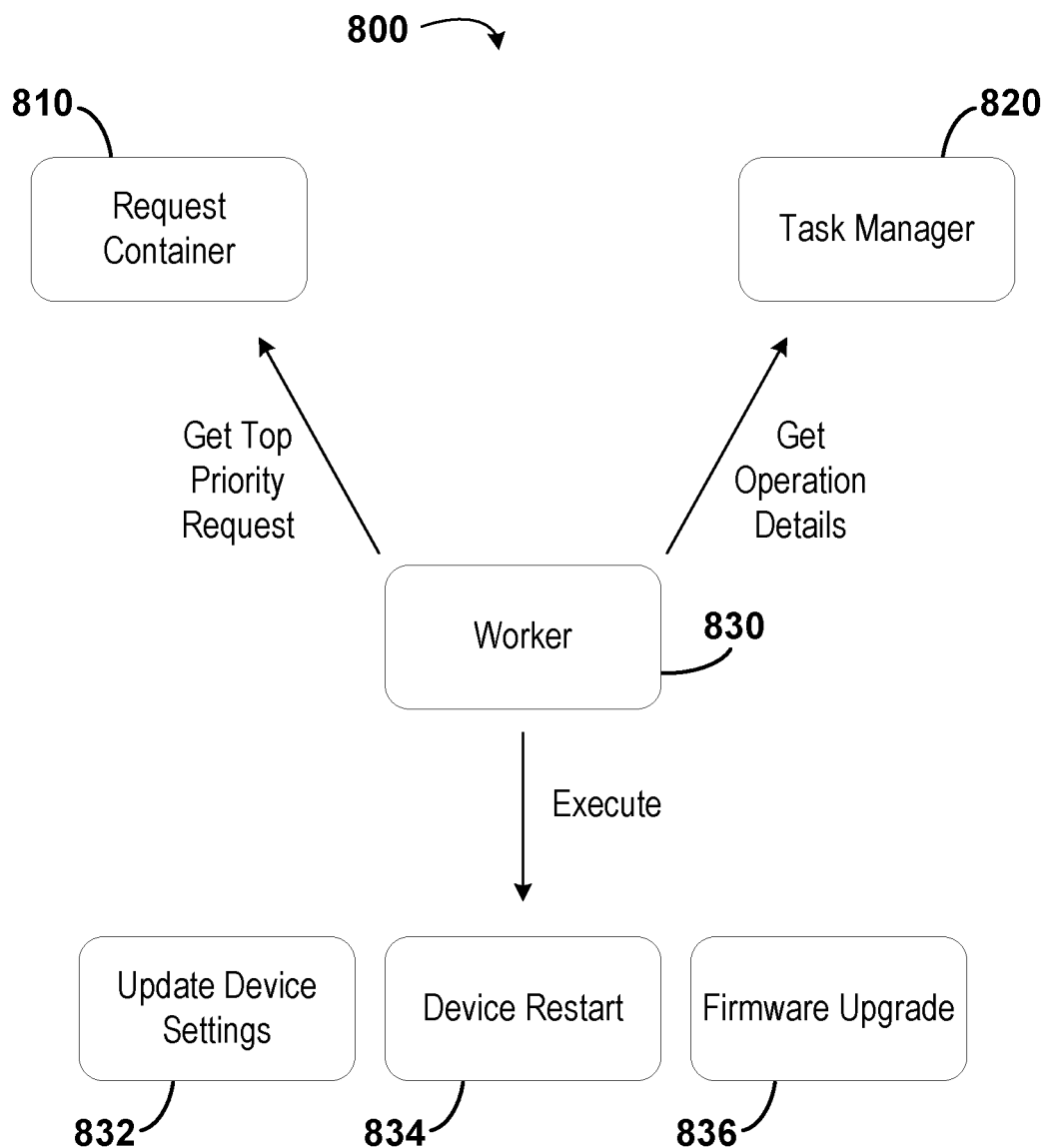
FIG. 8 is a schematic block diagram illustrating an operation execution, according to example embodiments.

FIG. 8 is an illustration of a method 800 of executing an operation, according to example embodiments. The method 800 may be executed by a worker 830 in communication with a request container 810 and a task manager 820. Further, the method 800 may include the worker 830 executing one or more operations, such as update device settings 832, device restart 834, or firmware upgrade 836. In some embodiments, the worker 830 or the request container 810 could be analogous to the one of the workers 732, 734, 736, 738 or the request container 720 illustrated in FIG. 7, respectively.

As illustrated, the worker 830 may contact the request container 810 to get the top priority request to be executed by the worker 830. As described above, if two requests are tied for the top priority level, the request container 810 may select one of the requests, at random, to provide to the worker 830 to execute. The random selection of a request from the request container 810 may include executing a reliable linear random generator (e.g., random generator based on a linear distribution) to select one of the requests. Once the top priority request is retrieved, the worker 830 may then contact the task manager 820 to determine the operation details of the request retrieved. For example, the operation details may indicate on which printing device the corresponding operation is to be executed. From there, the worker 830 executes the operation on one or more printing devices, as defined by the request. The operation may include updating device settings 832, a device restart 834, or a firmware upgrade 836.

Figure 9:
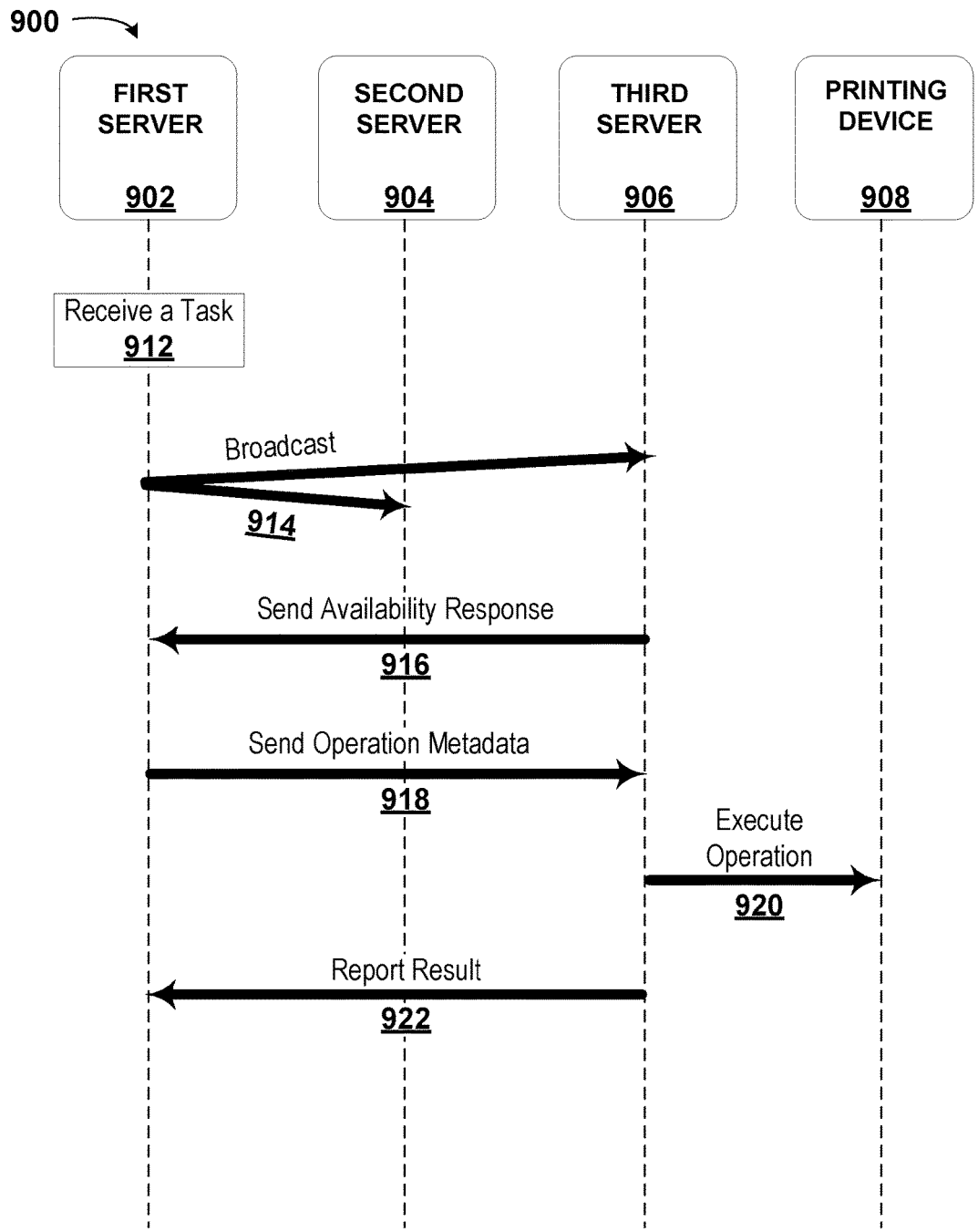
FIG. 9 is a data flow diagram illustrating a method, according to example embodiments.

FIG. 9 is a data flow diagram illustrating a method 900, according to example embodiments. The method 900 may be performed by a first server 902, a second server 904, a third server 906, and a printing device 908. The communications between the first server 902, the second server 904, the third server 906, and the printing device 908 illustrated in FIG. 9 may be stateless in some embodiments. As such, each request and/or response may be independent of every other request and/or response, so states need not be maintained within the servers 902, 904, 906 or the printing device 908.

At operation 912, the method 900 may include the first server 902 receiving a task. The task may be received from a terminal device. For example, a user (e.g., a printing device technician within an organization) may send a request to the first server 902 indicating that operations should be executed on one or more printing devices within the organization. Alternatively, a manufacturer of printing devices may release updated firmware for one or more printing devices and transmit it to the first server 902 to install on one or more printing devices within the organization. In other embodiments, the task received in operation 912 may have originated from one of the other servers (e.g., the second server 904 or the third server 906). Alternatively, the first server 902 itself may generate the task 912. For example, the task 902 may be generated by one or more high level microservices being executed within the first server 902.

At operation 914, the method 900 may include the first server 902 broadcasting to the second server 904 and the third server 906. Operation 914 may include the first server 902 using a repository (e.g., a service registry stored within the first server 902) to identify the network addresses (e.g., URLs) to which the broadcast should be transmitted. Broadcasting to the second server 904 and the third server 906 may include sending a message to the second server 904 and the third server 906 indicating that the first server 902 has an operation that requires execution. In some embodiments, the name of the operation may be sent to the second server 904 and the third server 906, such that the second server 904 and the third server 906 can identify if they have any workers available to execute the specific type of operation (e.g., available computing resources and associated instructions that are executable to perform the operation). FIG. 9 is shown by way of example, and should not be viewed as limiting. For example, in other embodiments, more than two servers may receive the broadcast from the first server 902 (e.g., five servers, ten servers, fifty servers, one-hundred servers, five-hundred servers, one-thousand servers, etc.).

At operation 916, the method 900 may include the third server 906 sending an availability response to the first server 902. Sending the availability response may include the third server 906 transmitting a message to the first server 902 indicating that at least one of the workers of the third server 906 has the availability to take on an operation. Further, the message may indicate that at least one of the workers that has the availability to take on the operation is capable of executing the type of operation that was broadcast by the first server 902.

At operation 918, the method 900 may include the first server 902 sending operation metadata to the third server 906. The operation metadata may include information about the operation to be used by the third server 906 in the execution of the operation. For example, the operation metadata may include the network addresses (e.g., URLs) of the target printing device(s) on which the operation is to be executed, the make, model, or manufacturer of the target printing device(s), when the operation is to be executed on the target printing devices, or other information about the operation execution (e.g., operation-specific metadata, such as firmware version number or software license number).

At operation 920, the method 900 may include the third server 906 executing an operation on the printing device 908. The operation may be executed by a worker within the third server 906, in some embodiments. For example, executing the operation may include updating device firmware on the printing device 908. The operation may additionally or alternatively include monitoring or polling the printing device 908 for a current state of the printing device 908 (e.g., whether the printing device 908 is online, whether the printing device 908 is currently printing, what version number of printing device firmware is installed on the printing device 908, how much paper is remaining in the printing device 908, how much toner is remaining in the printing device 908, etc.). FIG. 9 is provided by way of example. It is understood that in many embodiments, executing the operation will include the third server 906 (e.g., a "worker" within the third server 906) executing the operation on multiple printing devices (e.g., five, ten, fifty, one-hundred, five-hundred, one-thousand, five-thousand, ten-thousand, fifty-thousand, one-hundred-thousand, etc.). Further, the printing device 908 may have been a target printing device specified in the operation metadata. In some embodiments, the printing device 908 may report data about the operation execution back to the third server 906 upon the completion of the operation (e.g., report how much time the operation took or any errors that occurred while executing the operation).

At operation 922, the method 900 may include the third server 906 reporting the result to the first server 902. Reporting the result to the first server 902 may include reporting any errors that occurred during the execution of the operation or other information about the operation execution (e.g., time to complete the operation). In some embodiments, reporting the result to the first server 902 may include informing the first server 902 that a respective worker in the third server 906 is available to execute additional operations (e.g., because the operation is completed, and the worker is no longer tied up executing that operation). Further, if an error occurred during operation 920 (e.g., one or more of the printing devices did not have its firmware successfully updated), after the result is reported to the first server 902, the first server 902 may instruct the third server 906 to roll back the operation executed on the printing device 908. Rolling back the operation may involve reverting the printing device 908 to a previous state (e.g., an older version of printing device firmware). Reverting the printing device 908 to a previous state may include uninstalling current software and reinstalling prior software on the printing device 908, for example.

Figure 10:
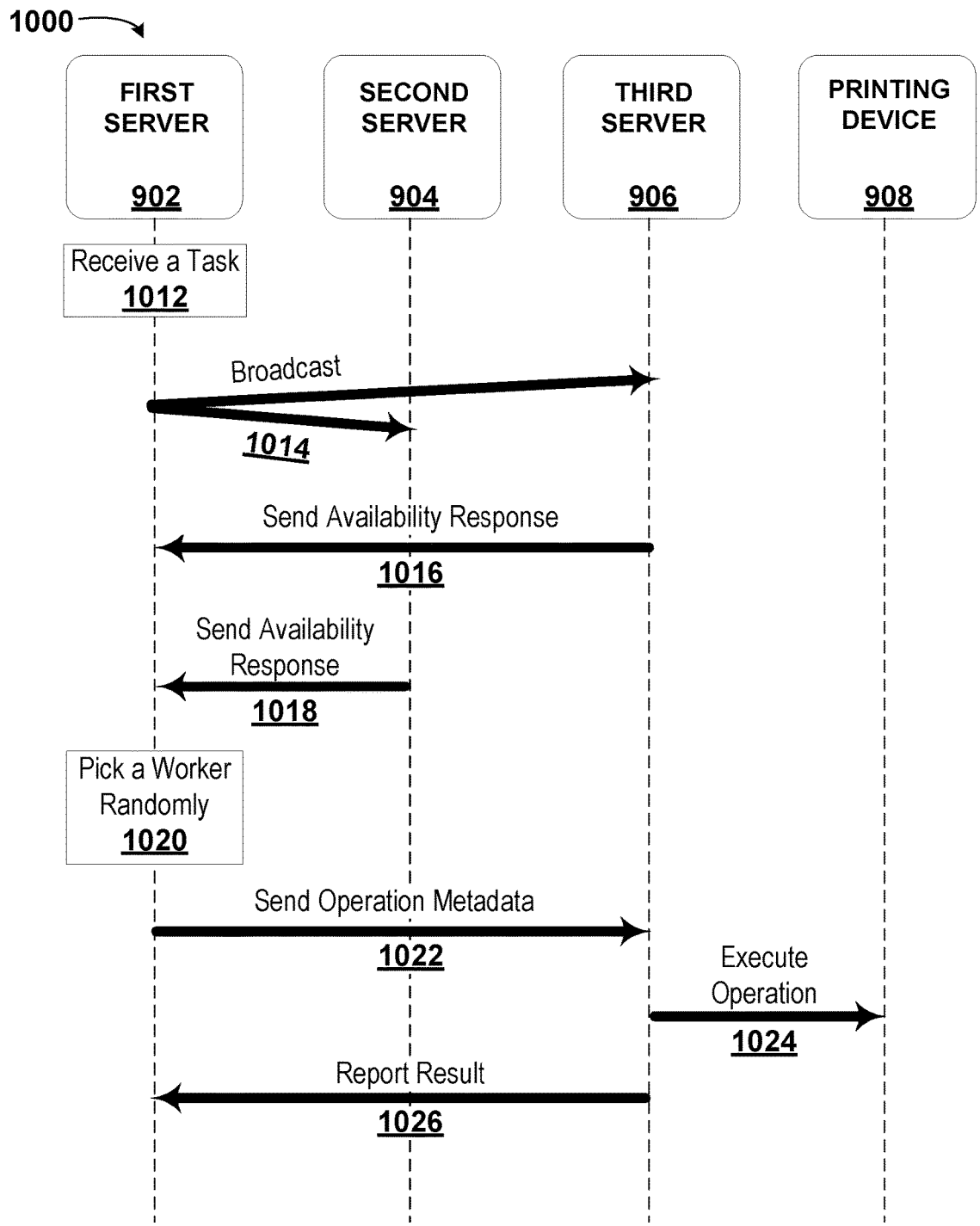
FIG. 10 is a data flow diagram illustrating a method, according to example embodiments.

FIG. 10 is a data flow diagram illustrating a method 1000, according to example embodiments. The method 1000 may be performed by a first server 902, a second server 904, a third server 906, and a printing device 908. The method 1000 illustrated in FIG. 10 may be analogous to the method 900 illustrated in FIG. 9, with the exception that both the second server 904 and the third server 906 respond to the broadcast 1014 with availability responses (as opposed to solely the third server 906). The communications between the first server 902, the second server 904, the third server 906, and the printing device 908 illustrated in FIG. 10 may be stateless in some embodiments. As such, each request and/or response may be independent of every other request and/or response, so states need not be maintained within the servers 902, 904, 906 or the printing device 908.

At operation 1012, the method 1000 may include the first server 902 receiving a task. Operation 1012 may be analogous to operation 912 illustrated in FIG. 9. For example, the task may be received from a terminal device based on user input, from another server (e.g., the second server 904), or from a printing device (e.g., a request from the printing device 908 for upgraded firmware).

At operation 1014, the method 1000 may include the first server 902 broadcasting to the second server 904 and the third server 906. Operation 1014 may be analogous to operation 914. For example, broadcasting to the second server 904 and the third server 906 may include using a service registry (e.g., a service registry stored within the first server 902) to retrieve addresses (e.g., URLs) associated with the second server 904 and the third server 906. Upon retrieving the addresses, the first server 902 may broadcast the operation to those addresses.

At operation 1016, the method 1000 may include the third server 906 sending an availability response to the first server 902. Sending the availability response may include the third server 906 transmitting a message to the first server 902 indicating that at least one of the workers of the third server 906 has the availability to take on an operation. Further, the message may indicate that at least one of the workers that has the availability to take on the operation is capable of executing the type of operation that was broadcast by the first server 902.

At operation 1018, the method 1000 may include the second server 904 sending an availability response to the first server 902. Sending the availability response may include the second server 904 transmitting a message to the first server 902 indicating that at least one of the workers of the second server 904 has the availability to take on an operation. Further, the message may indicate that at least one of the workers that has the availability to take on the operation is capable of executing the type of operation that was broadcast by the first server 902.

In some embodiments, operation 1018 may occur prior to operation 1016. Alternatively, operation 1016 and operation 1018 may occur concurrently. The first server 902 may have a predefined waiting period after broadcasting to the second server 904 and the third server 906 in which the first server 902 waits to receive responses. The first server 902 may accept and process any response sent during the waiting period.

At operation 1020, the method 1000 may include the first server 902 picking a worker randomly. For example, based on the availability responses of the second server 904 and the third server 906 in operations 1016 and 1018, the first server 902 may be informed of two or more workers within the second server 904 or third server 906 capable of executing the operation on the computing device 908. One of these workers may be randomly selected by the first server 902 to execute the operation. Randomly selecting one of the workers may be used to perform load balancing (e.g., second-level load balancing). For example, if the random selection is performed each time multiple workers are available to execute operations, over many occurrences, the load on each worker should be roughly evenly distributed.

At operation 1022, the method 1000 may include the first server 902 sending operation metadata to the third server 906. Operation 1022 may be analogous to operation 918 illustrated in FIG. 9. For example, the operation metadata may include information about the operation to be used by the third server 906 in the execution of the operation.

At operation 1024, the method 1000 may include the third server 906 executing the operation on the printing device 908. Operation 1024 may be analogous to operation 920 illustrated in FIG. 9. For example, the operation may include updating device firmware on the printing device 908.

At operation 1026, the method 1000 may include the third server 906 reporting the result to the first server 902. Operation 1026 may be analogous to operation 922 illustrated in FIG. 9. For example, reporting the result to the first server 902 may include reporting any errors that occurred during the executing of the operation or other information about the operation execution (e.g., time to complete the operation).

Figure 11:
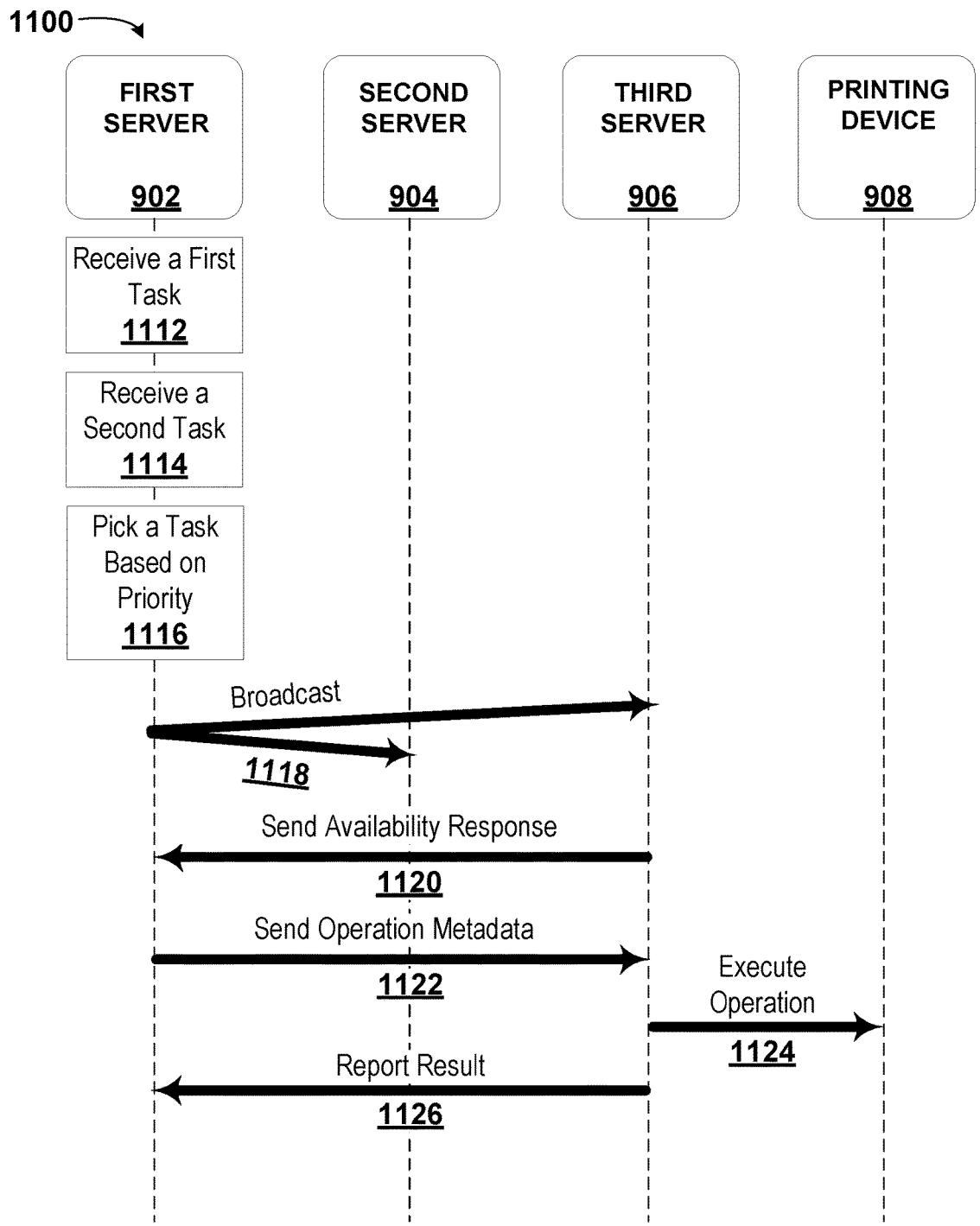
FIG. 11 is a data flow diagram illustrating a method, according to example embodiments.

FIG. 11 is a data flow diagram illustrating a method 1100, according to example embodiments. The method 1100 may be performed by a first server 902, a second server 904, a third server 906, and a printing device 908. The method 1100 illustrated in FIG. 11 may be analogous to the method 900 illustrated in FIG. 9, with the exception that two tasks may be received for processing by the first server 902. The communications between the first server 902, the second server 904, the third server 906, and the printing device 908 illustrated in FIG. 11 may be stateless in some embodiments. As such, each request and/or response may be independent of every other request and/or response, so states need not be maintained within the servers 902, 904, 906 or the printing device 908.

At operation 1112, the method 1100 may include the first server 902 receiving a first task. Operation 1112 may be analogous to operation 912. For example, the task may be received from a terminal device (e.g., based on a user request).

At operation 1114, the method 1100 may include the first server 902 receiving a second task. Operation 1114 may be analogous to operation 912 and/or operation 1112. For example, the task may be received from a terminal device (e.g., based on a user request). The first task and the second task received in operations 1112 and 1114 may be transmitted by the same terminal device, printing device, or server, or by different terminal devices, printing devices, or servers. For example, the first task may be transmitted to the first server 902 by a printing device and the second task may be transmitted to the first server 902 by another server. Further, the tasks may be received within a task acceptance window of the first server 902. For example, the first server 902 may have a predefined length of time over which it accepts tasks for execution (e.g., every morning from 9:00 AM until 9:05 AM or for five seconds every hour). In other embodiments, more than two tasks may be received by the first server 902 (e.g., three, five, ten, twenty, fifty, or one-hundred tasks).

At operation 1116, the method 1100 may include the first server 902 picking a task based on priority. The first server 902 may select a task at operation 1116 because the first server 902 does not have sufficient computing resources to process both the first task received in operation 1112 and the second task received in operation 1114 concurrently. Therefore, the first server 902 may select only one of the two tasks to process. After completion of the selected task, the first server 902 may move on and process the other task. Alternatively, upon selection of one of the tasks to process, the first server 902 may transmit the unselected task to another server for processing.

Picking a task based on priority may include selecting the task with the higher priority level. The priority levels of each of the tasks may be stored within a request container of the first server 902 (e.g., within a priority table). For example, a user request to execute a task that includes viewing the current status of the device may have a "high" priority level within a priority table, whereas a firmware upgrade task may have a "low" priority within a priority table. The priority levels may alternatively be numbers (e.g., integers, floats, or doubles) used to represent a given priority, rather than strings. Such numbers may allow for increased granularity of priority levels, for example. Alternatively, the priority levels may be metadata that is inherently associated with the tasks. Further, the priority levels may be preset or may be set dynamically (e.g., based on available computing resources or other factors within a network or organization). For example, the priority table may be "hard-coded" in the respective server, set based on user input (e.g., received at a terminal device), or dynamically adjusted based on data gathered from associated users, associated printing devices, or associated servers. Additionally, if the first task and the second task have the same priority level, one of the two tasks may be selected at random. In other embodiments, if the first task and the second task have the same priority level the first task may be selected because it was the first task to be received by the first server 902.

At operation 1118, the method 1100 may include the first server 902 broadcasting to the second server 904 and the third server 906. Operation 1118 may be analogous to operation 914 illustrated in FIG. 9. For example, operation 1118 may include the first server 902 using a repository (e.g., a service registry stored within the first server 902) to identify the network addresses (e.g., URLs) to which the broadcast should be transmitted. Further, broadcasting to the second server 904 and the third server 906 may include sending a message to the second server 904 and the third server 906 indicating that the first server 902 has an operation that requires execution (e.g., an operation that is part of a task).

At operation 1120, the method 1100 may include the third server 906 sending an availability response to the first server 902. Operation 1120 may be analogous to operation 916 illustrated in FIG. 9. For example, sending the availability response may include the third server 906 transmitting a message to the first server 902 indicating that at least one of the workers of the third server 906 has the availability to take on an operation.

At operation 1122, the method 1100 may include the first server 902 sending operation metadata to the third server 906. Operation 1122 may be analogous to operation 918 illustrated in FIG. 9. For example, the operation metadata may include information about the operation to be used by the third server 906 in the execution of the operation.

At operation 1124, the method 1100 may include the third server 906 executing the operation on the printing device 908. Operation 1124 may be analogous to operation 920 illustrated in FIG. 9. For example, executing the operation on the printing device 908 may include updating device firmware on the printing device 908.

At operation 1126, the method 1100 may include the third server 906 reporting the result to the first server 902. Operation 1126 may be analogous to operation 922 illustrated in FIG. 9. For example, reporting the result to the first server 902 may include reporting any errors that occurred during the execution of the operation or other information about the operation execution (e.g., time to complete the operation).

Figure 12:
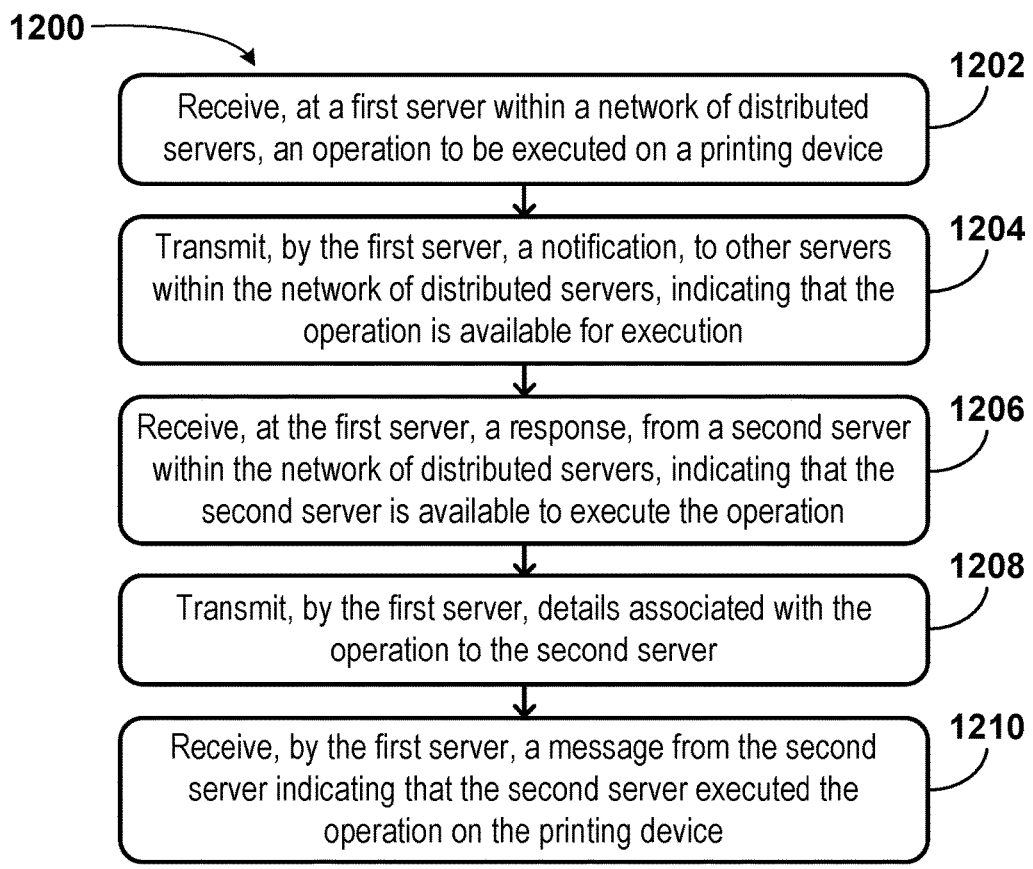
FIG. 12 is a flow chart illustrating a method, according to example embodiments.

FIG. 12 is a flow chart illustrating a method 1200, according to example embodiments.

At block 1202, the method 1200 may include receiving, at a first server within a network of distributed servers, an operation to be executed on a printing device. The printing device may be communicatively coupled to at least one of the distributed servers within the network. In some embodiments, each of the distributed servers within the network may be communicatively coupled to the printing device. The operation may include updating firmware of the printing device, for example. Further, the first server may be randomly selected among the network of distributed servers to receive the operation. The random selection may provide a first-level load balancing of the network of distributed servers.

At block 1204, the method 1200 may include transmitting, by the first server, a notification, to other servers within the network of distributed servers, indicating that the operation is available for execution. Transmitting, by the first server, the notification may include executing, by a processor of the first server, instructions corresponding to a service registry stored within a non-transitory, computer-readable medium; obtaining, based on the service registry, a list of other servers within the network that can complete the operation; and transmitting, by the first server, the notification to the other servers on the list. Transmitting, by the first server, the notification may include executing, by the processor of the first server, instructions corresponding to a task manager stored within a non-transitory, computer-readable medium.

At block 1206, the method 1200 may include receiving, at the first server, a response, from a second server within the network of distributed servers, indicating that the second server is available to execute the operation. The response indicates that the second server has available computing resources to execute the operation. In some embodiments, the response may also provide a list of types of operations that the second server can execute (e.g., a list of what types of workers are installed on the second server for executing operations).

In some embodiments, the first server may receive responses from each of a plurality of servers within the network of distributed servers, where each response indicates that the respective server is available to execute the operation. In such embodiments, the first server may randomly select one of the servers to execute the operation. The randomly selected server may be the "second server" described above and below with respect to FIG. 12. The random selection of a server to execute the operation may provide a second-level load balancing of the network of distributed servers, in some embodiments. Additionally or alternatively, second-level load balancing may be a natural result of the fact that only servers with available resources to execute an operation respond to the notification transmitted by the first server.

At block 1208, the method 1200 may include transmitting, by the first server, details associated with the operation to the second server.

At block 1210, the method 1200 may include receiving, by the first server, a message from the second server indicating that the second server executed the operation on the printing device. In some embodiments, the message from the second server may contain execution data regarding the operation (e.g., any errors that occurred or runtime).

The method 1200 may also include executing, by the second server, the operation on the printing device. Additionally or alternatively, the method 1200 may include receiving, at the first server, a secondary operation to be executed on the printing device; and determining, by the first server, that the operation has a higher priority level than the secondary operation. The higher priority level may be stored within a priority table. The priority table may be stored within a memory of the first server.

Figure 13:
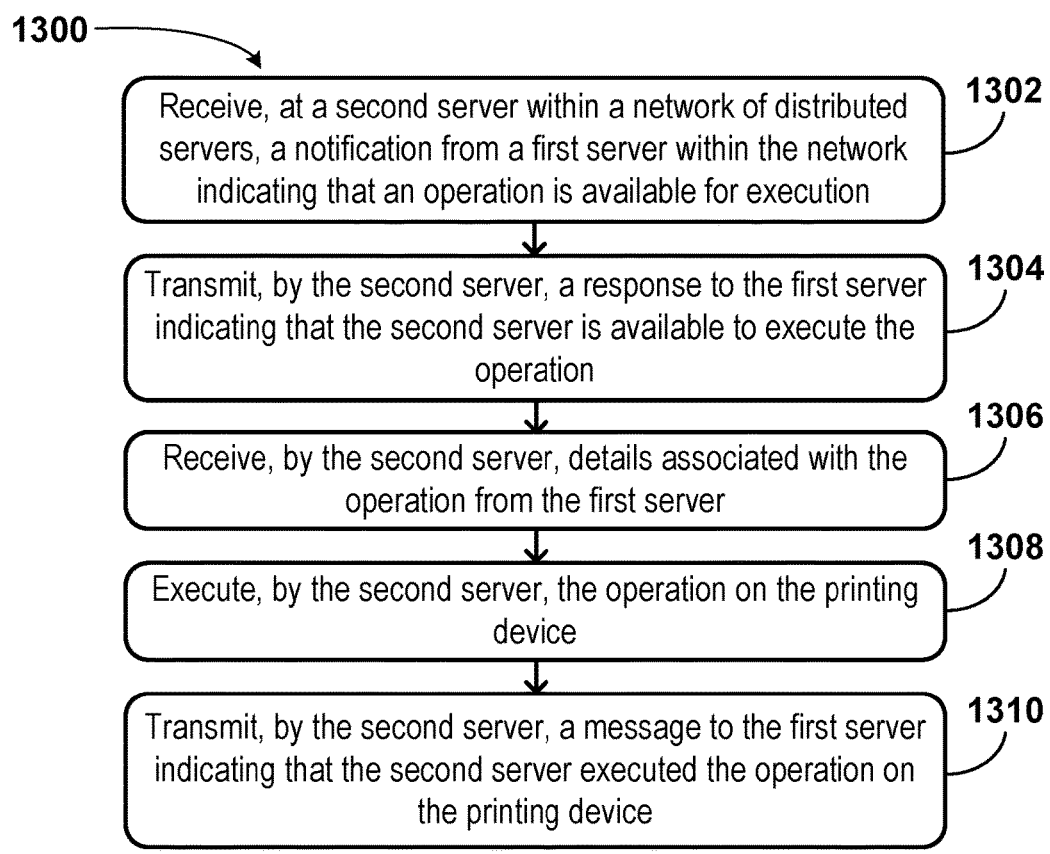
FIG. 13 is a flow chart illustrating a method, according to example embodiments.

FIG. 13 is a flow chart illustrating a method 1300, according to example embodiments.

At block 1302, the method 1300 may include receiving, at a second server within a network of distributed servers, a notification from a first server within the network indicating that an operation is available for execution. The operation is to be executed on a printing device communicatively coupled to at least one of the distributed servers within the network.

At block 1304, the method 1300 may include transmitting, by the second server, a response to the first server indicating that the second server is available to execute the operation. The response indicates that the second server has available computing resources to execute the operation.

At block 1306, the method 1300 may include receiving, by the second server, details associated with the operation from the first server.

At block 1308, the method 1300 may include executing, by the second server, the operation on the printing device. Executing, by the second server, the operation on the printing device may include updating, by the second server, firmware on the printing device.

At block 1310, the method 1300 may include transmitting, by the second server, a message to the first server indicating that the second server executed the operation on the printing device.

In some embodiments, the method 1300 may also include executing, by a processor the second server, instructions corresponding to a worker manager stored within a non-transitory, computer-readable medium; and determining, during execution of the worker manager, that resources are available to execute the operation. The worker manager may include instructions for determining if computing resources are available to execute operations.

IV. CONCLUSION

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration only and are not intended to be limiting, with the true scope being indicated by the following claims.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed:

1. A method, comprising:
   receiving, at a first server within a network of distributed servers embodied as computing devices, an operation to be executed on a printing device, wherein the printing device is communicatively coupled to at least one of the distributed servers within the network;
   transmitting, by the first server, a notification, to other servers within the network of distributed servers, indicating that the operation is available for execution;
   receiving, at the first server, a response, from a second server within the network of distributed servers, indicating that the second server is available to execute the operation, wherein the response indicates that the second server has available computing resources to execute the operation;
   transmitting, by the first server, details associated with the operation to the second server; and
   receiving, by the first server, a message from the second server indicating that the second server executed the operation on the printing device,
   wherein the first server is randomly selected among the network of distributed servers to receive the operation,
   wherein the random selection of the first server provides a first-level load balancing of the network of distributed servers,
   wherein the method further comprises:

receiving, by the first server, from each of a plurality of servers within the network of distributed servers, a response indicating that the respective server is available to execute the operation; and randomly selecting, by the first server, the second server to execute the operation, wherein randomly selecting the second server to execute the operation provides a second-level load balancing of the network of distributed servers.

2. The method of claim 1, further comprising executing, by the second server, the operation on the printing device.

3. The method of claim 1, wherein each of the distributed servers within the network is communicatively coupled to the printing device.

4. The method of claim 1, wherein the message from the second server contains execution data regarding the operation.

5. The method of claim 1, further comprising:
receiving, at the first server, a secondary operation to be executed on the printing device; and
determining, by the first server, that the operation has a higher priority level than the secondary operation.

6. The method of claim 5, wherein the higher priority level is stored within a priority table, and wherein the priority table is stored within a memory of the first server.

7. The method of claim 1, wherein the operation comprises updating firmware of the printing device.

8. The method of claim 1, wherein the response further provides a list of types of operations that the second server can execute.

9. The method of claim 1, wherein transmitting, by the first server, the notification comprises:
executing, by a processor of the first server, instructions corresponding to a service registry stored within a non-transitory, computer-readable medium;
obtaining, based on the service registry, a list of other servers within the network that can execute the operation; and
transmitting, by the first server, the notification to the other servers on the list.

10. The method of claim 9, wherein transmitting, by the first server, the notification comprises executing, by the processor of the first server, instructions corresponding to a task manager stored within a non-transitory, computer-readable medium.

11. A method, comprising:
receiving, at a second server within a network of distributed servers embodied as computing devices, a notification from a first server within the network indicating that an operation is available for execution,
wherein the operation is to be executed on a printing device communicatively coupled to at least one of the distributed servers within the network;
transmitting, by the second server, a response to the first server indicating that the second server is available to execute the operation, wherein the response indicates that the second server has available computing resources to execute the operation;
receiving, by the second server, details associated with the operation from the first server;
executing, by the second server, the operation on the printing device; and
transmitting, by the second server, a message to the first server indicating that the second server executed the operation on the printing device,
wherein the first server is randomly selected among the network of distributed servers to receive the operation, wherein the random selection of the first server provides a first-level load balancing of the network of distributed servers, wherein each of a plurality of servers within the network of distributed servers transmits a response indicating that the respective server is available to execute the operation;

wherein the second server is randomly selected, by the first server, to execute the operation, wherein the random selection of the second server to execute the operation provides a second-level load balancing of the network of distributed servers.

12. The method of claim 11, further comprising:
executing, by a processor of the second server, instructions corresponding to a worker manager stored within a non-transitory, computer-readable medium; and
determining, during execution of the worker manager, that resources are available to execute the operation.

13. The method of claim 12, wherein the worker manager comprises instructions for adding a worker to a worker pool, wherein the worker pool comprises a plurality of workers, and wherein each worker is a set of instructions that can execute operations on at least one printing device.

14. The method of claim 13, wherein the worker manager comprises instructions for adding the worker to the worker pool only if computing resources are available within the server.

15. The method of claim 12, wherein the worker manager comprises instructions for removing a worker from a worker pool if the worker has not been used to execute operations for a threshold amount of time.

16. The method of claim 12, wherein the worker manager comprises instructions for dynamically resizing a worker pool in response to workers being added to the working pool.

17. The method of claim 12, wherein the worker manager comprises instructions for removing a worker from the worker pool if computing resources are overloaded.

18. The method of claim 12, wherein the worker manager comprises instructions for determining if computing resources are available to execute operations.

19. The method of claim 11, wherein executing, by the second server, the operation on the printing device comprises updating, by the second server, firmware of the printing device.

20. A computing device with instructions stored thereon on a non-transitory, computer-readable medium that, when executed by a processor, perform actions comprising:
receiving, at the computing device, an operation to be executed on a printing device,
wherein the computing device is located within a network of distributed servers embodied as computing devices, and
wherein the printing device is communicatively coupled to at least one of the distributed servers within the network;
transmitting, by the computing device, a notification, to other servers within the network of distributed servers, indicating that the operation is available for execution;
receiving, at the computing device, a response, from a second computing device within the network of distributed servers, indicating that the second computing device is available to execute the operation, wherein the response indicates that the second computing device has available computing resources to execute the operation;

transmitting, by the computing device, details associated with the operation to the second computing device; and receiving, by the computing device, a message from the second computing device indicating that the second computing device executed the operation on the printing device, wherein the computing device is randomly selected among the network of distributed servers to receive the operation, wherein the random selection of the computing device provides a first-level load balancing of the network of distributed servers, wherein the method further comprising
  receiving, by the computing device, from each of a plurality of servers within the network of distributed servers, a response indicating that the respective server is available to execute the operation; and
  randomly selecting, by the computing device, the second computing device to execute the operation, wherein randomly selecting the second computing device to execute the operation provides a second-level load balancing of the network of distributed servers.

* * * * *